(12) United States Patent
Honma et al.

(10) Patent No.: US 10,571,963 B2
(45) Date of Patent: Feb. 25, 2020

(54) HOUSING

(71) Applicant: TORAY INDUSTRIES, INC., Tokyo (JP)

(72) Inventors: Masato Honma, Ehime (JP); Takashi Fujioka, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/760,333

(22) PCT Filed: Sep. 6, 2016

(86) PCT No.: PCT/JP2016/076116
§ 371 (c)(1),
(2) Date: Mar. 15, 2018

(87) PCT Pub. No.: WO2017/047439
PCT Pub. Date: Mar. 23, 2017

(65) Prior Publication Data
US 2018/0299925 A1   Oct. 18, 2018

(30) Foreign Application Priority Data

Sep. 18, 2015 (JP) .................... 2015-185985
Sep. 18, 2015 (JP) .................... 2015-185987
Sep. 18, 2015 (JP) .................... 2015-185992

(51) Int. Cl.
*G06F 1/16* (2006.01)
*H04B 1/3888* (2015.01)
*H04M 1/02* (2006.01)

(52) U.S. Cl.
CPC .......... *G06F 1/1628* (2013.01); *G06F 1/1603* (2013.01); *H04B 1/3888* (2013.01); *H04M 1/0202* (2013.01)

(58) Field of Classification Search
CPC ........ G06F 1/1628; G06F 1/1603; G06F 1/16; H04B 1/3888; H04M 1/02; H04M 1/0202; H05K 5/02
(Continued)

(56) References Cited

U.S. PATENT DOCUMENTS 8,355,760 B2   1/2013   Kim
2008/0146293 A1   6/2008   Kim
(Continued)

FOREIGN PATENT DOCUMENTS

CN   102341429 A   2/2012
CN   104470715 A   3/2015
(Continued)

OTHER PUBLICATIONS

International Search Report, issued in PCT/JP2016/076116, PCT/ISA/210, dated Oct. 18, 2016.
(Continued)

*Primary Examiner* — Eugene Yun
(74) *Attorney, Agent, or Firm* — Birch, Stewart, Kolasch & Birch, LLP

(57) ABSTRACT

A housing includes: a top cover; a bottom cover having a rising wall member erected toward the top cover and joined to the top cover at a rim; and a reinforcing structure which is disposed in a space divided by the top cover and the bottom cover, and has an opening, the reinforcing structure being joined to the bottom cover. The bottom cover is formed of a material having a thickness of 0.1 mm or more and 0.8 mm or less and an elastic modulus of 20 GPa or more and 120 GPa or less.

18 Claims, 10 Drawing Sheets

(58) Field of Classification Search
USPC .................................................... 455/575.8
See application file for complete search history.

(56) References Cited

U.S. PATENT DOCUMENTS

| | | |
|---|---|---|
| 2011/0319525 A1 | 12/2011 | Maeda et al. |
| 2012/0069498 A1 | 3/2012 | Tang et al. |
| 2015/0183183 A1 | 7/2015 | Takano et al. |
| 2015/0266260 A1 | 9/2015 | Fujioka et al. |

FOREIGN PATENT DOCUMENTS

| | | |
|---|---|---|
| CN | 104781065 A | 7/2015 |
| JP | 8-288681 A | 11/1996 |
| JP | 10-150280 A | 6/1998 |
| JP | 2003-101250 A | 4/2003 |
| JP | 2007-305041 A | 11/2007 |
| JP | 2009-218444 A | 9/2009 |
| JP | 2011-22848 A | 2/2011 |
| JP | 2013-74043 A | 4/2013 |
| JP | 2017-59791 A | 3/2017 |
| JP | 2017-59793 A | 3/2017 |
| WO | WO 2010/109957 A1 | 9/2010 |
| WO | WO 2015/119064 A1 | 8/2015 |

OTHER PUBLICATIONS

Written Opinion of the International Searching Authority, issued in PCT/JP2016/076116, PCT/ISA/237, dated Oct. 18, 2016.
Extended European Search Report dated Mar. 27, 2019, in European Patent Application No. 16846310.7.
Chinese Office Action and Search Report for Chinese Application No. 201680053896.7, dated Aug. 20, 2019, with English translation of the Office Action Action.
Japanese Office Action for Japanese Application No. 2015-185985, dated Oct. 1, 2019, with English translation.
Japanese Office Action for Japanese Application No. 2015-185987, dated Oct. 1, 2019, with English translation.
Japanese Office Action for Japanese Application No. 2015-185992, dated Oct. 1, 2019, with English translation.

(a)  (b)

(a) (b)

HOUSING

TECHNICAL FIELD

The present invention relates to a housing such as a housing in which an electronic device part is built (electronic device housing), and a housing such as an attache case or a carry case.

BACKGROUND ART

In recent years, for reducing the thickness and weight of an electronic device, improving the portability of the electronic device, and preventing breakage of components in the electronic device, a housing has been required to have increased rigidity. Specifically, when the electronic device is held with one hand and operated with the other hand, when the electronic device is transported, or when a monitor or the like is opened or closed, a biased load is applied, and therefore a force acts on the housing in a torsion direction. In addition, if the electronic device is dropped by accident during transportation, a force also acts in a torsion direction. Therefore, the housing is required to have high torsional rigidity. In addition, when pressure is applied to a housing at a cramped place such as a crowded train or when an object is dropped (when a load is applied in a thickness direction), an internal electronic component or a liquid crystal component such as a display, particularly a glass member may be damaged, and therefore the housing is required to have high deflection rigidity. In view of such a background, many techniques for increasing the rigidity of a housing have been heretofore proposed.

Specifically, Patent Document 1 discloses an invention for increasing the rigidity of an electric device cabinet structure which includes a resin lower case having upper and lower electric device mounting surfaces, and an upper case having a front wall overlapping the upper electric device mounting surface. Patent Document 2 discloses an invention for increasing the rigidity of an electronic device housing by abutting the tip of a rib, which is formed on the inner surface of a first housing, against the inner surface of a second housing. Patent Document 3 discloses an invention for increasing the rigidity of an electronic device housing of by making the electronic device housing have a structure in which surfaces of two plates are selectively bonded and joined together.

In addition, in recent years, a housing has been more frequently exposed to a high-temperature environment due to heat generation associated with use in a high-temperature and high-humidity environment and sophistication of specifications of electronic components. Under such a high-temperature environment, for example, it may be unable to operate buttons due to occurrence of warpage or distortion, waterproofness may be deteriorated due to generation of gaps, or rigidity may be reduced due to detachment of a reinforcing structure, leading to impairment of functions inherent in an electronic device when the housing is formed of different materials. In view of such a background, many techniques for improving the dimensional stability of the housing have been proposed.

Specifically, Patent Document 4 discloses an invention for improving the heat dissipation property of an information processing apparatus including an outer housing to which a first case and a second case are bonded, and a metal frame disposed in the outer housing and attached to the outer housing. Patent Document 3 discloses an invention for increasing the rigidity of an electronic device housing of by making the electronic device housing have a structure in which surfaces of two plates are selectively bonded and joined together.

PRIOR ART DOCUMENTS

Patent Documents

Patent Document 1: Japanese Patent Laid-open Publication No. 10-150280
Patent Document 2: Japanese Patent Laid-open Publication No. 2011-22848
Patent Document 3: Japanese Patent Laid-open Publication No. 8-288681
Patent Document 4: Japanese Patent Laid-open Publication No. 2007-305041

SUMMARY OF THE INVENTION

Problems to be Solved by the Invention

However, in the inventions disclosed in Patent Documents 1 and 2, the housing is formed of a resin material, and therefore it is not possible to provide a housing having a level of torsional rigidity and deflection rigidity required in the market. In the inventions disclosed in Patent Documents 1 and 2, it is also conceivable that the housing is formed from a metal plate. However, in the inventions disclosed in Patent Documents 1 and 2, the housing is formed by joining or abutting members. Thus, even if the housing is formed from a metal plate, it is not possible to provide a housing having a level of torsional rigidity required in the market. In addition, when the housing is formed from a metal plate, the weight of the housing increases, and thus it is not possible to meet market needs from the viewpoint of lightness.

In the invention disclosed in Patent Document 3, the rigidity of the housing of an electronic device is increased by joining an inner plate to the whole surface of an outer plate. However, the inner plate is provided with a heat pipe channel by stretch-molding, so that the thickness of the plate decreases, and therefore torsional rigidity required for the housing cannot be attained. In addition, a method in which an inner plate is joined to the whole surface of an outer plate is not a method for effectively improving rigidity from the viewpoint of lightness, and it is not likely that a sufficient level of torsional rigidity is obtained.

As described above, in conventional techniques for increasing the rigidity of the housing, it is not possible to impart high torsional rigidity and deflection rigidity to the housing while attaining thickness reduction and weight reduction. Thus, it is expected to provide a technique capable of imparting high torsional rigidity and deflection rigidity to the housing while attaining thickness reduction and weight reduction.

In addition, in conventional techniques for increasing the rigidity of the housing, it is not possible to impart high torsional rigidity to the housing while attaining thickness reduction, weight reduction and improvement of portability. Thus, it is expected to provide a technique capable of imparting high torsional rigidity to the housing while attaining thickness reduction and weight reduction.

In addition, in the invention disclosed in Patent Document 4, each member is fixed by screws, and therefore when a fixed portion is exposed to high heat as the information processing device is operated, distortion occurs in each member, leading to impairment of dimensional stability. Similarly, in the invention disclosed in Patent Document 3, the surfaces of two plates are bonded to each other, and therefore when a bonded portion is exposed to high heat as the electronic device is operated, the bonded portion is delaminated, leading to impairment of dimensional stability. Thus, it is desired to provide a technique capable of imparting high dimensional stability to the housing. In addition, fixed or joined members serve to increase rigidity, and therefore if distortion or delamination occurs, rigidity that should be properly exhibited cannot be secured.

The present invention has been made in view of the above-described problems, and an object of the present invention is to provide a housing having improved torsional rigidity and deflection rigidity while attaining thickness reduction and weight reduction.

Another object of the present invention is to provide a housing having improved torsional rigidity while attaining thickness reduction, weight reduction and improvement of portability.

Still another object of the present invention is to provide a housing having high torsional rigidity and improved dimensional stability.

Solutions to the Problems

A housing according to a first aspect of the present invention includes: a top cover; a bottom cover having a rising wall member erected toward the top cover and joined to the top cover at a rim; and a reinforcing structure which is disposed in a space divided by the top cover and the bottom cover, and has an opening, the reinforcing structure being joined to the bottom cover, in which the bottom cover being formed of a material having a thickness of 0.1 mm or more and 0.8 mm or less and an elastic modulus of 20 GPa or more and 120 GPa or less.

A housing according to a second aspect of the present invention includes: a top cover; a bottom cover having a rising wall member erected toward the top cover and joined to the top cover at a rim; and a reinforcing structure which is disposed in a space divided by the top cover and the bottom cover, and has an opening, the reinforcing structure being joined to the bottom cover, in which the bottom cover is formed of a fiber-reinforced composite material that is a cured product of a laminate of prepregs including a reinforcing fiber and a matrix resin.

In the housings according to the first and second aspects of the present invention, the reinforcing structure is formed of a material having a thickness of 0.3 mm or more and 0.8 mm or less, and an elastic modulus of 20 GPa or more and 120 GPa or less, in the above-described invention.

A housing according to a third aspect of the present invention includes: a top cover; a bottom cover having a rising wall member erected toward the top cover and joined to the top cover at a rim; and a reinforcing structure which is disposed in a space divided by the top cover and the bottom cover, and has an opening, the reinforcing structure being joined to the bottom cover, in which the reinforcing structure is formed of a material having a thickness of 0.3 mm or more and 0.8 mm or less and an elastic modulus of 20 GPa or more and 120 GPa or less.

A housing according to a fourth aspect of the present invention includes: a top cover; a bottom cover having a rising wall member erected toward the top cover and joined to the top cover at a rim; and a reinforcing structure which is disposed in a space divided by the top cover and the bottom cover, and has an opening, the reinforcing structure being joined to the bottom cover, in which the reinforcing structure is formed of a fiber-reinforced composite material that is a cured product of a laminate of prepregs including a reinforcing fiber and a matrix resin.

In the housings according to the third and fourth aspects of the present invention, the bottom cover is formed of a material having a thickness of 0.1 mm or more and 0.8 mm or less, and an elastic modulus of 20 GPa or more and 120 GPa or less, in the above-described invention.

In the housings according to the first, second, third and fourth aspects of the present invention, the reinforcing structure, and the top cover or the bottom cover to which the reinforcing structure is joined are formed of a fiber-reinforced composite material that is a cured product of a laminate of prepregs including a reinforcing fiber and a matrix resin, in the above-described invention.

A housing according to a fifth aspect of the present invention includes: a top cover; a bottom cover having a rising wall member erected toward the top cover and joined to the top cover at a rim; and a reinforcing structure which is disposed in a space divided by the top cover and the bottom cover, and has an opening, the reinforcing structure being joined to the bottom cover or the top cover, in which a ratio of the linear expansion coefficient of the reinforcing structure to the linear expansion coefficient of the bottom cover or the top cover which is joined to the reinforcing structure is within a range of 0.1 or more and 10 or less.

In the housings according to the first, second, third, fourth and fifth aspects of the present invention, the reinforcing structure is joined to the bottom cover or the top cover by thermal welding, in the above-described invention.

In the housings according to the first, second, third, fourth and fifth aspects of the present invention, the reinforcing structure is joined to the bottom cover or the top cover in such a manner that the peeling load at 23° C. is within a range of 60 N/cm$^2$ or more and 5000 N/cm$^2$ or less, and the peeling load at 200° C. is within a range of less than 60 N/cm$^2$, in the above-described invention.

In the housings according to the first, second, third, fourth and fifth aspects of the present invention, the reinforcing structure is joined directly to the top cover or the bottom cover, in the above-described invention.

In the housings according to the first, second, third, fourth and fifth aspects of the present invention, the projected area of the reinforcing structure in a direction of the bottom cover or the top cover which is joined to the reinforcing structure is within a range of 60% or more and 95% or less of the area of the bottom cover or the top cover to which the reinforcing structure is joined, in the above-described invention.

In the housings according to the first, second, third, fourth and fifth aspects of the present invention, the volume of a hollow structure formed by joining the reinforcing structure to the bottom cover or the top cover is within a range of 55% or more and 95% or less of the volume of the space, in the above-described invention.

In the housings according to the first, second, third, fourth and fifth aspects of the present invention, the reinforcing structure is joined to the bottom cover or the top cover to form a hollow structure, and a heat generation member is disposed on a surface of the reinforcing structure on the hollow structure side, in the above-described invention.

In the housings according to the first, second, third, fourth and fifth aspects of the present invention, another reinforcing structure connecting the inner surface of the reinforcing structure and the bottom cover to which the reinforcing structure is joined is provided in a hollow structure formed between the reinforcing structure and the bottom cover to which the reinforcing structure is joined, in the above-described invention.

Effects of the Invention

In the housing according to the present invention, torsional rigidity and deflection rigidity can be improved while thickness reduction and weight reduction are attained. In addition, the housing according to the present invention has improved torsional rigidity while attaining thickness reduction, weight reduction and improvement of portability. In addition, the housing according to the present invention has high torsional rigidity and improved dimensional stability.

EMBODIMENTS OF THE INVENTION

Hereinafter, a housing according to one embodiment of the present invention will be described with reference to FIGS. 1 to 7. Examples of the application of the housing of the present invention may include attache cases, carry cases and electronic device housings in which an electronic device component is built, and more specific examples thereof include speakers, displays, HDDs, notebook personal computers, mobile phones, digital still cameras, PDAs, plasma displays, televisions, lighting systems, refrigerator and game machines. In particular, the housing is preferably used for clamshell-type personal computers and tablet-type personal computers which have high torsional rigidity and are required to be light and thin.

Figure 1:
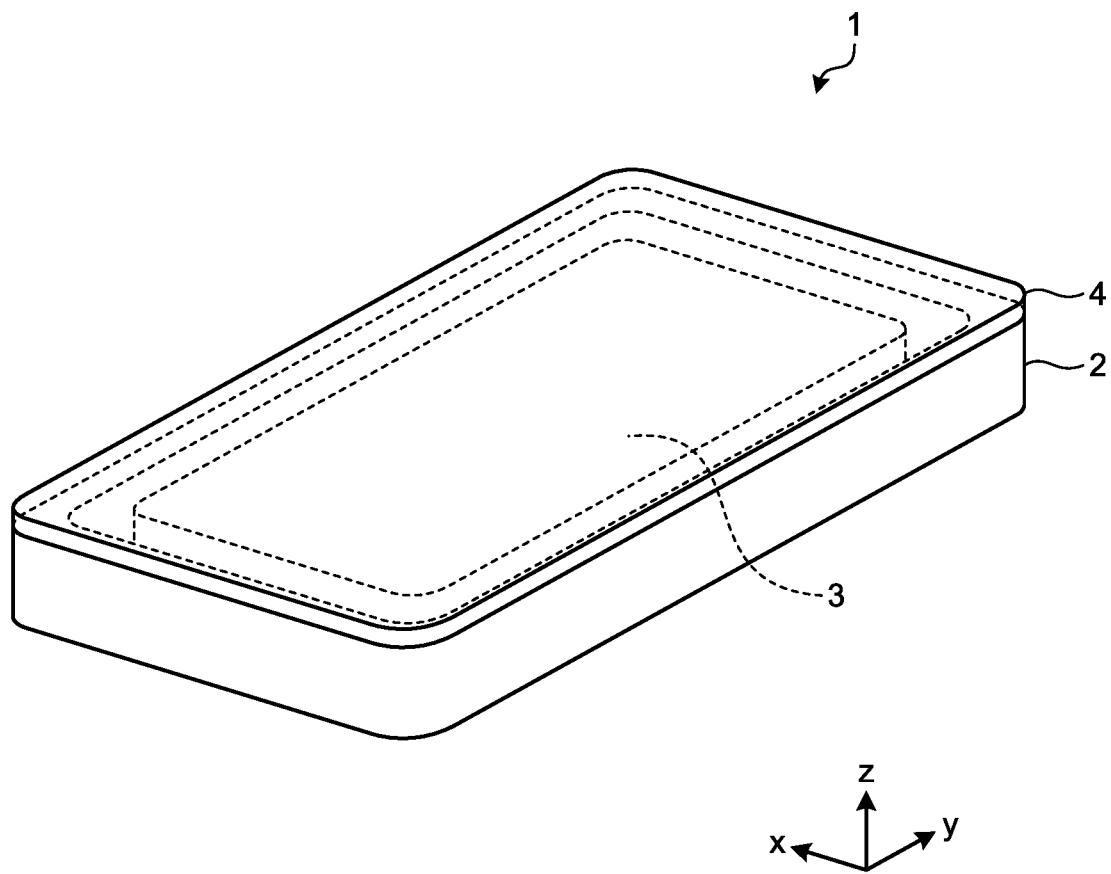
FIG. 1 is a perspective view showing a configuration of a housing according to one embodiment of the present invention.

FIG. 1 is a perspective view showing a configuration of the housing according to the first embodiment of the present invention. As shown in FIG. 1, a housing 1 according to one embodiment of the present invention includes, as main components, a bottom cover 2 rectangular in plan view, a reinforcing structure 3 joined to the bottom cover 2 and having an opening, and a top cover 4 rectangular in plan view. In the following description, a direction parallel to short sides of the bottom cover 2 and the top cover 4 is defined as an x direction, a direction parallel to long sides of the bottom cover 2 and the top cover 4 is defined as a y direction, and a direction perpendicular to the x direction and the y direction is defined as a z direction (vertical direction).

Figure 2:
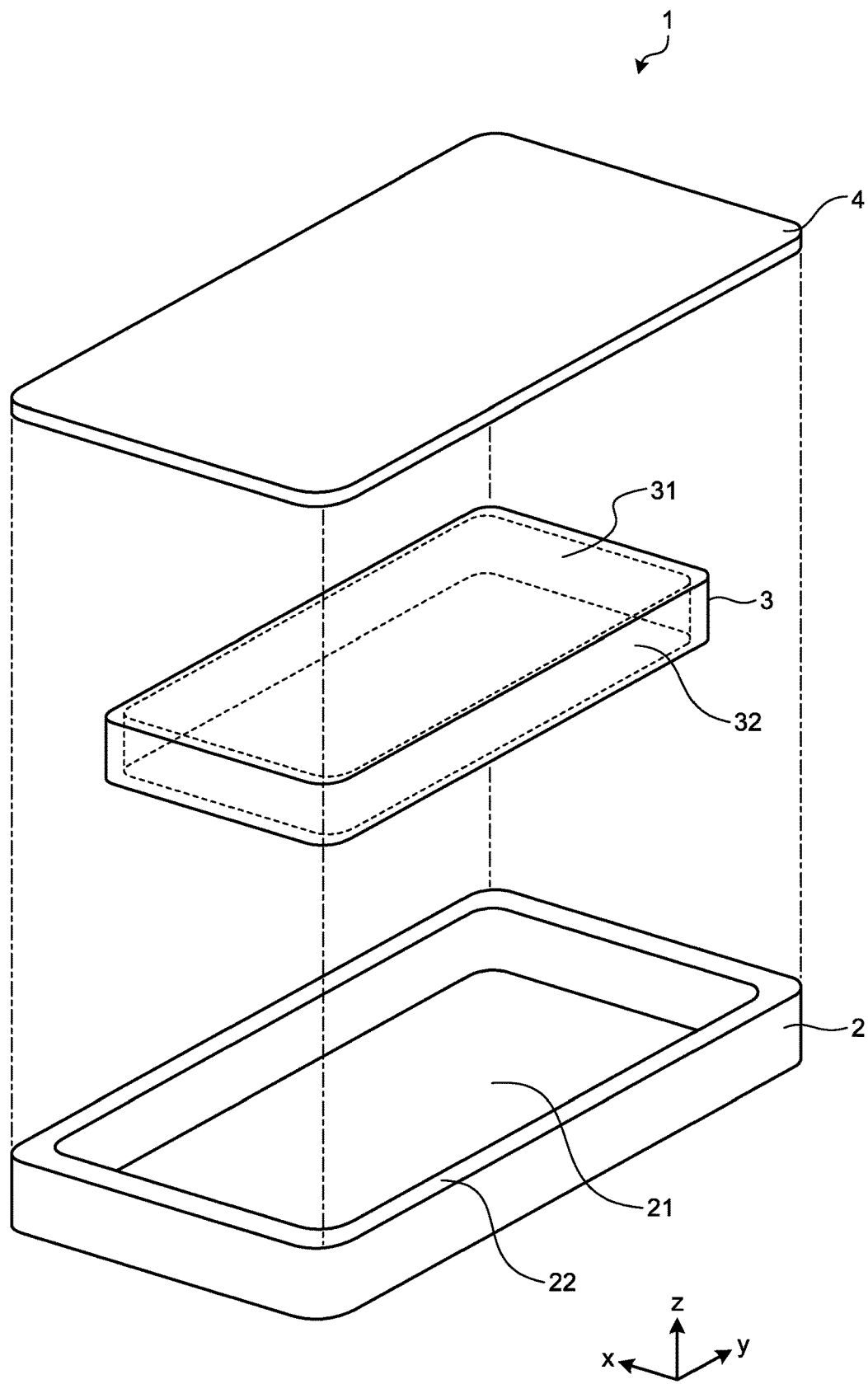
FIG. 2 is an exploded perspective view of the housing shown in FIG. 1.
Figure 3:
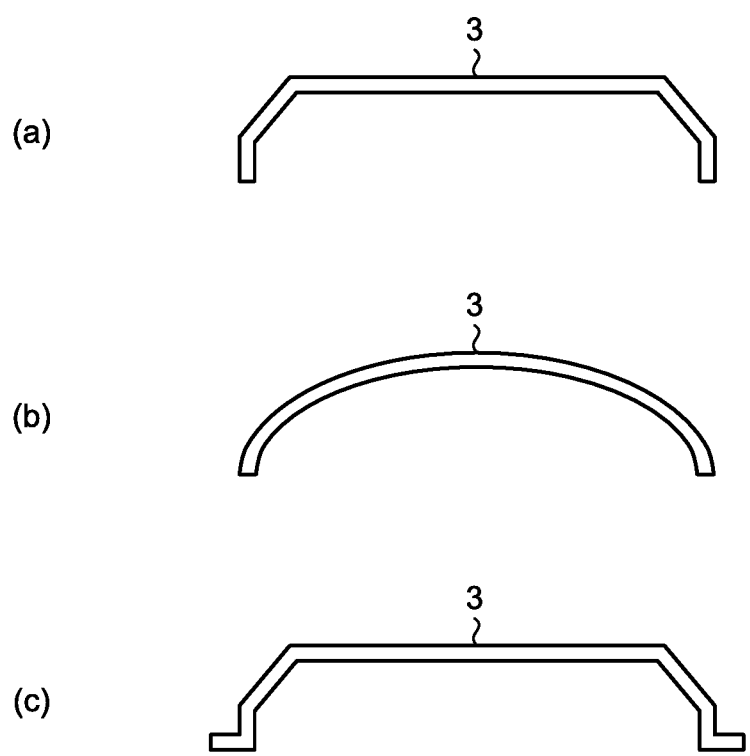
FIGS. 3(a) to 3(c) are sectional views showing one example of a configuration of a reinforcing structure.

FIG. 2 is an exploded perspective view of the housing 1 shown in FIG. 1. As shown in FIG. 2, the bottom cover 2 includes a flat portion 21 parallel to an x-y plane and rectangular in plan view, and a rising wall member 22 erected in the positive direction of z from a rim of the flat portion 21. The thickness of a member that forms the bottom cover 2 is preferably within a range of 0.1 mm or more and 0.8 mm or less. In addition, the elastic modulus of the member that forms the bottom cover 2 is preferably within a range of 20 GPa or more and 120 GPa or less.

In addition, it is preferable that the bottom cover 2 is formed of any one of a metal material and a fiber-reinforced composite material, and the bottom cover 2 may be formed by combining these materials. From the viewpoint of exhibiting high torsional rigidity, the bottom cover 2 is preferably a seamless member formed of the same material. From the viewpoint of productivity, the flat portion 21 having a simple shape may be formed using the metal material and the fiber-reinforced composite material which have high dynamic properties, and the rising wall member 22 and a joining portion which have a complicated shape may be formed by injection molding etc. using a resin material excellent in moldability.

It is preferable to use a light metal material such as an aluminum alloy, a magnesium alloy or a titanium alloy as the metal material. Examples of the aluminum alloy may include A2017 and A2024 as Al—Cu systems, A3003 and A3004 as Al—Mn systems, A4032 as an Al—Si system, A5005, A5052 and A5083 as Al—Mg systems, A6061 and A6063 as Al—Mg—Si systems, and A7075 as an Al—Zn system. Examples of magnesium alloy may include AZ31, AZ61 and AZ91 as Mg—Al—Zn systems. Examples of the titanium alloy may include alloys containing palladium of grades 11 to 23, alloys containing cobalt and palladium, and Ti-6Al-4V corresponding to grade 50 (α alloy), grade 60 (α-β alloy) and grade 80 (β alloy).

As reinforcing fibers to be used in the fiber-reinforced composite material, fibers such as carbon fibers, glass fibers, aramid fibers, boron fibers, PBO fibers, high strength polyethylene fibers, alumina fibers and silicon carbide fibers can be used, and two or more of these fibers may be mixed, and used. These reinforcing fibers can be used as fiber structures such as long fibers aligned in one direction, single tows, woven fabrics, knits, nonwoven fabrics, mats and braided cords.

Examples of the matrix resin that can be used include thermosetting resins such as epoxy resins, phenol resins, benzoxazine resins and unsaturated polyester resins, polyester-based resins such as polyethylene terephthalate (PET), polybutylene terephthalate (PBT), polytrimethylene terephthalate (PTT), polyethylene naphthalate and liquid crystal polyester, polyolefins such as polyethylene (PE), polypropylene (PP) and polybutylene, styrene-based resins, urethane resins, and thermosetting resins such as polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, polyimide (PI), polyamideimide (PAI), polyether imide (PEI), polysulfone (PSU), modified PSU, polyether sulfone (PES), polyketone (PK), polyether ketone (PEK), polyether ether ketone (PEEK), polyether ketone ketone (PEKK), polyarylate (PAR), polyether nitrile (PEN), phenol-based resins, and phenoxy resins. From the viewpoint of productivity and dynamic characteristics, thermosetting resins are preferably used, and among them, epoxy resins are preferably used. From the viewpoint of moldability, thermoplastic resins are preferably used. Among them, polyamide resins are preferably used from the viewpoint of strength, polycarbonate resins are preferably used from the viewpoint of impact resistance, polypropylene resins are preferably used from the viewpoint of lightness, and polyphenylene sulfide resins are preferably used from the viewpoint of heat resistance. The resin may be used not only as a matrix resin of the fiber-reinforced composite material but also as the bottom cover, the top cover or the reinforcing structure which is composed of a resin itself.

In the present invention, it is preferable that a prepreg including the reinforcing fiber and matrix resin is used as a material of each member from the viewpoint of handling characteristics in lamination etc. From the viewpoints of high dynamic characteristics and design freedom, it is preferable to use unidirectional continuous fiber prepreg, and from the viewpoint of isotropic dynamic characteristics and moldability, it is preferable to use a fabric prepreg. In addition, the member may be composed of a laminate of these prepregs.

The reinforcing structure 3 is a member having an opening. Specifically, the reinforcing structure 3 includes a flat portion 31 parallel to an x-y plane and rectangular in plan view, and a rising wall member 32 erected in the negative direction of z from a rim of the flat portion 31. A surface of the flat portion 31, which faces the flat portion 21 of the bottom cover 2, may be packed with an electronic device. The reinforcing structure 3 is joined to the bottom cover 2 with a hollow structure S1 formed between the flat portion 31 and the flat portion 21 of the bottom cover 2 by joining the reinforcing structure 3 to the flat portion 21 of the bottom cover 2. As used herein, the "reinforcing structure having an opening" refers to a shape having an opening in apart of the reinforcing structure, and may be a member having a flat portion, a rising wall member and a surface connecting the flat portion and the rising wall member as shown in FIGS. 3(a) and 3(b), or a member having a curved surface. In addition, one example of the reinforcing structure having an opening is a reinforcing structure having a flat portion, a rising wall member erected on the rim of the flat portion, and a joining portion extending from the rim of the rising wall member as shown in FIG. 3(c), or having a curved portion, and a joining portion extending from a rim of the curved.

The area of the joining area in a plane parallel to the x-y plane is preferably within a range of 10 cm$^2$ or more and 100 cm$^2$ or less. Specifically, when the joining area is less than 10 cm$^2$, there arises the problem if a load that causes large deformation is applied to the housing 1, the reinforcing structure 3 is peeled from the bottom cover 2, and thus original torsional rigidity cannot be exhibited. On the other hand, when the joining area is larger than 100 cm$^2$, there arises the problem that the increase in joining area causes an increase in weight of the housing 1 and a decrease in volume of the hollow structure S1. Thus, the joining area is preferably within a range of 10 cm$^2$ or more and 100 cm$^2$ or less.

The maximum value of a distance h between the flat portion 31 of the reinforcing structure 3 and the flat portion 21 of the bottom cover 2 (height of the reinforcing structure 3 from the flat portion 21) is preferably within a range of 3 mm or more and 30 mm or less. In the present invention, the height h of the reinforcing structure 3 is one factor of exhibiting torsional rigidity. Thus, when the maximum value of the height h is less than 3 mm, there arises the problem that the effect of the rising wall member 32 is low in the housing 1, so that original torsional rigidity cannot be exhibited. On the other hand, when the maximum value of the height h is larger than 30 mm, there arises the problem that it is necessary to increase the thickness of the rising wall member 32, resulting in an increase in weight of the housing 1. Thus, the maximum value of the height h is preferably within a range of 3 mm or more and 30 mm or less.

Figure 4:
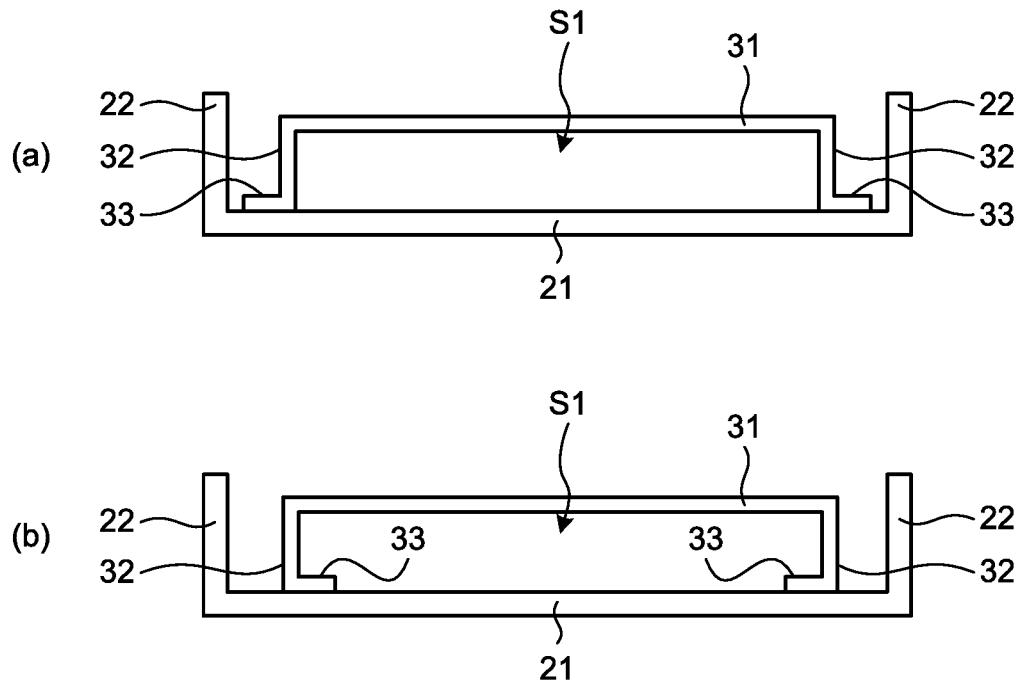
FIGS. 4(a) and 4(b) are sectional views showing one example of a configuration of the reinforcing structure shown in FIG. 2.
Figure 5:
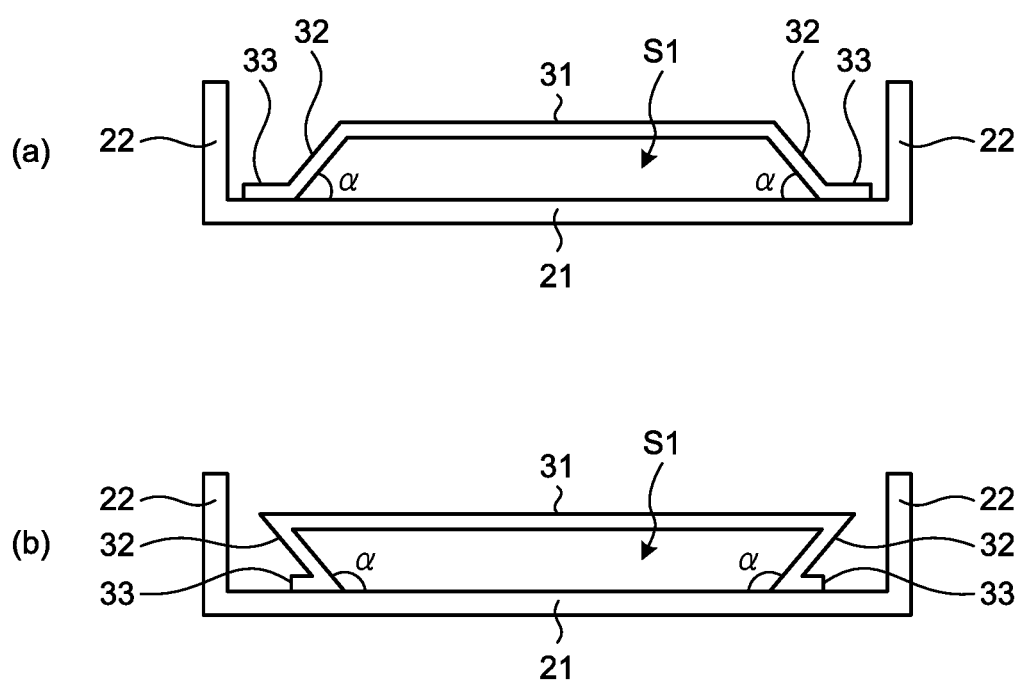
FIGS. 5(a) and 5(b) are sectional views showing one example of a configuration of the reinforcing structure shown in FIG. 2.

FIGS. 4 and 5 are sectional views showing one example of a configuration of the reinforcing structure 3 shown in FIG. 2. The joining portion 33 may be provided so as to extend in an outward direction parallel to the x-y plane from the rim of the rising wall member 32 as shown in FIG. 4(a). In addition, the joining portion 33 may be provided so as to extend in an inward direction parallel to the x-y plane from the peripheral portion of the rising wall member 32 as shown in FIG. 4(b). In addition, it is preferable that the angle α of the rising wall member 32 with respect to the flat portion 21 of the bottom cover 2 (or the joining portion 33 of the reinforcing structure 3) is within a range of 45° or more and 135° or less as shown in FIGS. 5(a) and 5(b). FIG. 5(a) shows a state in which the angle α of the rising wall member 32 is an acute angle, and FIG. 5(b) shows a state in which the angle α of the rising wall member 32 is an obtuse angle.

Figure 6:
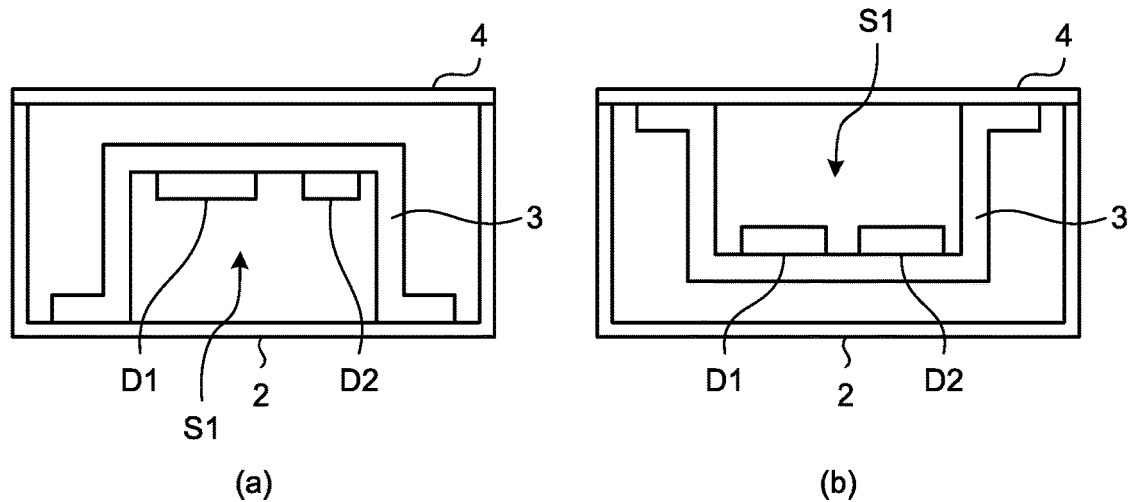
FIGS. 6(a) and 6(b) are sectional views showing one example of a configuration of a housing.

FIG. 6 is a sectional view showing one example of a configuration of the housing. As shown in FIGS. 6(a) and 6(b), heat generation members D1 and D2 are disposed in the hollow structure S1 formed by joining the reinforcing structure 3 and the bottom cover 2 or the top cover 4. It is preferable that the heat generation members D1 and D2 are disposed on a surface of the reinforcing structure 3 on the hollow structure S1 side. With this configuration, the distance between the bottom cover 2 touched by a user of an electronic device and the heat generation members D1 and D2 can be increased to suppress elevation of the temperature of the bottom cover 2. In this specification, the "heat generation member" means a component that generates heat as an electronic device is operated, and particularly refers to a component that causes temperature elevation by 10° C. or more as the electronic device is operated. Examples of the heat generation member may include LEDs, capacitors, inverters, reactor elements, thermistor elements, power transistor elements, motors, CPUs, and electronic boards on which these elements are mounted.

Deflection rigidity may also be increased by disposing another in the hollow structure S1 formed between the flat portion 31 of the reinforcing structure 3 and the flat portion 21 of the bottom cover 2. FIG. 7(a) is a plan view showing a configuration of another reinforcing structure, and FIG. 7(b) is a sectional view taken along line A-A in FIG. 7(a). As shown in FIGS. 7(a) and 7(b), another reinforcing structure 5 is a member disposed so as to extend in the x direction at the central part of the hollow structure S1 in the y direction, and is connected to the flat portion 21 of the bottom cover 2 and the flat portion 31 of the reinforcing structure 3. By integrating the flat portion 21 of the bottom cover 2 and the flat portion 31 of the reinforcing structure 3 with the other reinforcing structure 5 interposed therebetween, the bottom cover 2 and the reinforcing structure 3 are deformed in synchronization with each other if a load is applied, and therefore the deflection rigidity of the housing 1 can be improved. In addition, the rising wall member 22 of the bottom cover 2 and the rising wall member 32 of the reinforcing structure 3 are integrated with the other reinforcing structure 5, and thus the rising wall members of the bottom cover 2 and the reinforcing structure 3 are hardly deformed particularly inside direction of the housing 1, so that the torsional rigidity of the housing 1 can be improved.

As long as the other reinforcing structure 5 is connected to the flat portion 21 of the bottom cover 2 and the flat portion 31 of the reinforcing structure 3, the other reinforcing structure 5 may be a member disposed so as to extend in the y direction at the central part of the hollow structure S1 in the x direction, or a member disposed so as to extend in the diagonal direction of the hollow structure S1. In particular, it is preferable that the other reinforcing structure 5 is disposed so as to pass through a position at which the amount of deflection of the flat portion 21 of the bottom cover 2 increases when a load is applied in the thickness direction, and a plurality of members may be disposed with the members crossing one another. In addition, it is preferable that the other reinforcing structure 5 is formed of an impact absorbing material excellent in elasticity, such as a resin material having an elastomer or rubber component, or a gel, and accordingly, not only deflection rigidity but also an effect against impact can be exhibited.

In the present embodiment, a curved member may be used as the flat portion 31, resulting in omission of the rising wall member 32. In addition, from the viewpoint of increasing rigidity and effectively utilizing the space, an irregular shape may be formed on the flat portion 31. In the present embodiment, the reinforcing structure 3 is joined to the bottom cover 2, but the reinforcing structure 3 may be joined to the top cover 4 to form the hollow structure S1 between the flat portion 31 of the reinforcing structure 3 and the top cover 4.

In the present embodiment, the joining portion 33 is formed on all of the four rising wall members 32 formed on respective sides of the flat portion 31, but the joining portion 33 may be formed on at least one of the four rising wall members 32. Alternatively, the joining portion 33 may be formed on two or more adjacent rising wall members 32 among the four rising wall members 32. In addition, the area of the joining portion 33 formed on one rising wall member 32 is preferably 1 cm$^2$ or more. In addition, the thickness of the member that forms the reinforcing structure 3 is preferably within a range of 0.3 mm or more and 0.8 mm or less from the viewpoint of reducing the weight and thickness of the housing. In addition, the elastic modulus of the member that forms the reinforcing structure 3 is preferably within a range of 20 GPa or more and 120 GPa or less.

In addition, it is preferable that the reinforcing structure 3 is formed of any one of the above-described metal material and fiber-reinforced composite material, and the material can be selected according to the purpose of the reinforcing structure 3. That is, it is preferable to use a metal material or fiber reinforced composite material having a high elastic modulus from the viewpoint of exhibiting a high reinforcing effect, it is preferable to use a metal material having a high thermal conductivity from the viewpoint of heat dissipation, it is preferable to use a non-conductive material such as a resin or a glass fiber-reinforced composite material from the viewpoint of exhibiting radio wave permeability (antenna property), and it is preferable to use a conductive material such as a metal material or a carbon fiber-reinforced composite material from the viewpoint of exhibiting electromagnetic wave shielding property (radio wave shielding property). Further, when the reinforcing structure 3 is formed of a fiber-reinforced composite material, it is preferable that the reinforcing structure 3 is composed of a laminate of continuous fiber prepregs. In addition, the ratio of the linear expansion coefficient of the reinforcing structure 3 to the linear expansion coefficient of the bottom cover 2 to which the reinforcing structure 3 is joined is preferably within a range of 0.1 or more and 10 or less.

In addition, it is preferable that the reinforcing structure 3 is joined to the flat portion 21 of the bottom cover 2 by thermal welding. The peeling load at 23° C. is preferably within a range of 60 N/cm$^2$ or more and 5000 N/cm$^2$ or less, more preferably within a range of 100 N/cm$^2$ or more and 5000 N/cm$^2$ or less. Examples of the thermal welding method may include an insert injection method, an outsert injection method, a vibration welding method, an ultrasonic welding method, a laser welding method and a hot plate welding method. Here, it is preferable that the bonding surface between the reinforcing structure 3 and the flat portion 21 has a peeling load of less than 60 N/cm$^2$ at 200° C. The peeling load at 200° C. is more preferably 30 N/cm$^2$ or less.

In addition, this peeling load is preferably less than 60 N/cm$^2$ at 180° C., and it is preferable from the viewpoint of disassembling adhesive that the peeling load can be easily peeled off in a lower temperature range. However, when the disassembling temperature lowers, the reinforcing structure may be peeled off temperature elevation associated with operation of an electronic component or depending on the temperature of a use environment in use as a housing. Therefore, it is preferable that in the temperature range where the housing is used, the reinforcing structure is joined with high bonding strength, and in the disassembling temperature range, the reinforcing structure can be easily peeled off. Thus, the peeling load at 80° C. is more preferably within a range of 60 N/cm$^2$ or more and 5000 N/cm$^2$ or less.

The peeling load at 200° C. is preferably as low as possible, and most preferably 10 N/cm$^2$ or less. Since the peeling load at 200° C. is preferably as low as possible, the lower limit thereof is not particularly limited, and is preferably 0 N/cm$^2$ or more, but the peeling load at 200° C. is more preferably 1 N/cm$^2$ or more because when it is excessively low, handling characteristics may be deteriorated. With this configuration, disassembling bondability that makes it possible to easily remove the reinforcing structure 3 can be exhibited, so that repair and recycling of an electronic device can be facilitated. In addition, it is preferable that the reinforcing structure 3, and the bottom cover 2 to which the reinforcing structure 3 is joined are formed of a fiber-reinforced composite material, a thermoplastic resin is provided in or on a joining portion of at least one of the reinforcing structure 3 and the bottom cover 2, and the reinforcing structure 3 and the bottom cover 2 are joined with the thermoplastic resin, in the above-described invention.

As a method for providing a thermoplastic resin on the joining portion, mention is made of a method in which using a fiber-reinforced sheet (prepreg sheet) including a thermoplastic resin as a matrix resin, molding is performed to obtain the reinforcing structure 3, and the bottom cover 2 or the top cover 4 to which the reinforcing structure 3 is joined. A molded product obtained by this method is preferable because a thermoplastic resin is present on a surface of the molded product at a high ratio, and therefore it is possible to secure a wide bonding area in joining, leading to an increase in selection freedom of a joining site. From the viewpoint of the dynamic characteristics of the members, a fiber-reinforced composite material including a thermosetting resin as a matrix resin is preferable, and as a method for providing a thermoplastic resin on such a member, a mention is made of a method in which a molten material obtained by heating and melting a thermoplastic resin or a solution obtained by dissolving a thermoplastic resin in a solvent is applied to provide a thermoplastic resin on the fiber-reinforced composite material. In addition, a mention may be made of, for example, a method in which in molding and curing of a fiber-reinforced sheet (prepreg sheet) including a thermosetting resin as a matrix resin, a laminate in which a film or nonwoven fabric composed of a thermoplastic resin is laminated on a surface is molded under heat and pressure on the outermost layer of the fiber-reinforced sheet (prepreg sheet).

In addition, it is preferable that the reinforcing structure 3 and the bottom cover 2 or the top cover 4 are joined directly. When a fiber-reinforced composite material having a thermoplastic resin is used for the reinforcing structure 3 and/or the joining portion of the bottom cover 2 or the top cover 4 that is bonded to the reinforcing structure 3, it is not necessary to use an adhesive agent other than the members, and the members can be joined directly, so that an increase in weight of the housing 1 can be suppressed. A suitable method for directly joining the reinforcing structure 3 and the bottom cover 2 or the top cover 4 is a method using a laminate, in which a film or nonwoven fabric composed of a thermoplastic resin is laminated on a surface, for the outermost layer of a fiber-reinforced sheet (prepreg sheet) including a thermosetting resin as a matrix resin, and the thermoplastic resin used here can also be selected from the group of thermoplastic resins exemplified as the matrix resin.

Preferably, a thermoplastic resin is selected which has a melting point lower than the molding temperature at which a fiber-reinforced sheet (prepreg sheet) with the matrix resin composed of a thermosetting resin is molded and cured. The lower limit of the melting point of the thermoplastic resin is not particularly limited, but it is preferably 80° C. or higher, more preferably 100° C. or higher from the viewpoint of exhibiting heat resistance in application of the housing of the present invention to an electronic device. In addition, the form of the thermoplastic resin is not particularly limited, and examples thereof include forms of films, continuous fibers, woven fabrics, particles, nonwoven fabrics and the like, but from the viewpoint of handling characteristics during molding operation, forms of films and nonwoven fabrics are preferable. By selecting such a resin, the thermoplastic resin is melted during molding, and the thermoplastic resin is formed while spreading like a film over a surface of a molded product, so that the bonding area increases during joining, or the reinforcing fibers of the fiber-reinforced sheet are impregnated with the thermoplastic resin to form a strong thermoplastic resin layer, so that high peeling strength can be exhibited. The thermoplastic resin may be provided on at least one of the reinforcing structure 3 obtained in the above-mentioned method and the bottom cover 2 and the top cover 4 joined to the reinforcing structure 3, but it is preferable that the thermoplastic resin is provided on the joining members of both the members to be joined. In addition, it is preferable that substantially the same thermoplastic resin is selected as thermoplastic resins to be provided.

In this specification, the "disassembling adhesive" means that the reinforcing structure 3 can be not only easily removed, but also re-bonded, and in re-bonding, the thermoplastic resin may be provided, but it is preferable that the reinforcing structure can be re-bonded without increasing the weight of the thermoplastic resin or the like. In addition, the peeling load in re-bonding is preferably 50% or more, more preferably 70% or more, of the original peeling load. The disassembling adhesive in the present invention can be attained by applying to a joining technique such characteristics of a thermoplastic resin that the resin is melted by heating to reduce dynamic characteristics, and the resin is solidified by cooling or at normal temperature to exhibit high dynamic characteristics specific to the resin.

In addition, a hole can be formed in each of the flat portion 31 and the rising wall member 32 of the reinforcing structure 3 to the extent that torsional rigidity in the present invention is improved. With such a structure, it is possible to dispose a wiring cable for connecting an electronic component built in the hollow structure S1 to an electronic component disposed in a space other than the hollow structure S1 divided by the bottom cover 2 and the top cover 4, and a display, a key board and so on which correspond to the top cover 4. From the viewpoint of heat dissipation, it is preferable that the hole is disposed to so as to improve the flow of air, e.g. the hole is formed on the opposed rising wall member 32. The area of the holes is preferably 30% or less of the surface area of the reinforcing structure 3, and is more desirably 15% or less of the surface area of the reinforcing structure 3 from the viewpoint of torsional rigidity.

The top cover 4 is joined to the rim of the rising wall member 22 of the bottom cover 2. In FIG. 1, the top cover 4 has a smooth plate shape, but may have a plate shape having a curved surface or irregularities. The material and shape of the top cover 4 may be the same as those of the bottom cover 2, and a plurality of reinforcing structures may be disposed and joined in a space by dividing the reinforcing structure 3 by the bottom cover 2 and the top cover 4. With such a configuration, the housing 1 having high rigidity on either of surfaces thereof can be obtained. In addition, the top cover 4 may be an electronic component such as a liquid crystal display or a keyboard, and with such a configuration, application to a clamshell-type personal computer or a tablet-type personal computer is possible.

The hollow structure S1 may be formed by forming the reinforcing structure 3 from a member having an opening, and joining the reinforcing structure 3 to the bottom cover 2 or the top cover 4. Here, it is preferable that the projected area of the reinforcing structure 3 in a direction of the bottom cover 2 or top cover 4 to which the reinforcing structure 3 is joined is adjusted to fall within a range of 60% or more and 95% or less of the projected area of the bottom cover 2 or top cover 4 to which the reinforcing structure 3 is joined. The disposed position of the reinforcing structure 3 is not particularly limited, but it is preferable that the reinforcing structure 3 is positioned equally from the center position C of the bottom cover 2 or the top cover 4, and by disposing the reinforcing structure 3 in this manner, torsional rigidity in an x direction or a y direction can be made isotropic. From the viewpoint of effectively utilizing a space other than the hollow structure S1, in the space divided by the bottom cover 2 and the top cover 4, the reinforcing structure 3 may be placed on any one of the bottom cover 2 or the top cover 4.

Specifically, when the projected area of the reinforcing structure 3 is less than 60% of the area of the bottom cover 2 or the top cover 4 to which the reinforcing structure 3 is joined, there arises the problem that the rising wall member that is one factor of exhibiting torsional rigidity in the present invention is formed at a position close to the center position of the bottom cover 2 or the top cover 4, so that original torsional rigidity cannot be exhibited. On the other hand, when the projected area of the reinforcing structure 3 is more than 95% of the area of the bottom cover 2 or the top cover 4 to which the reinforcing structure 3 is joined, high torsional rigidity can be exhibited, but there arises the problem that the space other than the hollow structure S1 becomes small, and therefore it is difficult to dispose electronic components and wiring and the like for forming an electronic device, so that application as a housing is difficult. Thus, the projected area in a direction of the bottom cover 2 or top cover 4 to which the reinforcing structure 3 is joined is preferably within a range of 60% or more and 95% or less of the area of the joined bottom cover 2 or top cover 4 to which the reinforcing structure 3 is joined.

Here, the shape of the projected surface of the reinforcing structure 3, i.e. the shape of the flat portion 31 is not particularly limited, and may be not only a rectangular shape, but also a circular shape or a polygonal shape, and from the viewpoint of exhibiting high deflection rigidity, a shape conforming to the shape of the bottom cover 2 and/or the top cover 4 is preferable. Specifically, the shape of the projected surface of the reinforcing structure 3 is preferably a rectangular shape. In addition, from the viewpoint of effectively utilizing the hollow structure S1 and a space other than the hollow structure S1, the shape of the projected surface of the reinforcing structure 3 is preferably a shape conforming to the shape of an electronic component to be packed. In addition, from the viewpoint of exhibiting isotropic rigidity against any load, the shape of the projected surface of the reinforcing structure 3 is preferably a shape that is symmetric with respect to an axis in the x direction and/or the y direction.

In addition, when the hollow structure S1 is formed by forming the reinforcing structure 3 from a member having the opening, and joining the reinforcing structure 3 to the bottom cover 2 or the top cover 4, the volume of the hollow structure S1 formed by the reinforcing structure 3 in the bottom cover 2 is preferably within a range of 55% or more and 95% or less of the volume of the space divided by the bottom cover 2 and the top cover 4. Specifically, when the volume of the hollow structure S1 is less than 55% of the volume of the space divided by the bottom cover 2 and the top cover 4, there arises the problem that the height of the rising wall member that is one factor exhibiting torsional rigidity in the present invention is low and/or the projected area of the reinforcing structure 3 is small, so that original torsional rigidity cannot be exhibited. On the other hand, when the volume of the hollow structure S1 is more than 95% of the volume of the space divided by the bottom cover 2 and the top cover 4, high torsional rigidity can be exhibited, but there arises the problem that the space other than the hollow structure S1 becomes small, and thus it is difficult to dispose electronic components and wiring and the like for forming an electronic device, so that application as a housing is difficult. Thus, the volume of the hollow structure S1 is preferably within a range of 55% or more and 95% or less of the volume of the space divided by the bottom cover 2 and the top cover 4.

EXAMPLES

Hereinafter, first and second aspects of the present invention will be described in detail by way of examples. However, the present invention is not limited to the following examples.
<Evaluation and Measurement Methods>
(1) Torsional Rigidity Test A housing 1 was fixed in a tester in such a manner that one side of the housing 1 was fixed by a U-shaped fixing tool 100, and the other side opposed to the fixed side was held by a support tool 101 as shown in FIG. 8(a), the displacement amount of the housing 1 was then measured when a load of 50 N was applied with a change rate set to 1°/min at an angle θ as shown in FIG. 8(b), and the measured value was defined as a torsional rigidity value of the housing.
(2) Deflection Rigidity Test As shown in FIG. 9, the housing was installed in a tester in such a manner that it was able to apply a load F from the side of a bottom cover 2 or a top cover 4 to which a reinforcing structure was joined. "Instron" (registered trademark) Universal Tester Model 4201 (manufactured by Instron Co., Ltd.) was used as a tester. The deflection amount of the bottom cover 2 or the top cover 4 was measured when a load of 100 N was applied with the housing 1 pressed at the center position at a cross head speed of 1.0 mm/min using an indenter 102 having a diameter of 20 mm, and the measured value was defined as a deflection rigidity value.
(3) Evaluation of Flexural Modulus In accordance with the specifications in ASTM D-790 (1997), the flexural moduli of materials to be used for the reinforcing structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. "Instron" (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.
(4) Peeling Load Test of Reinforcing Structure (23° C. and 200° C.)

Figure 10:
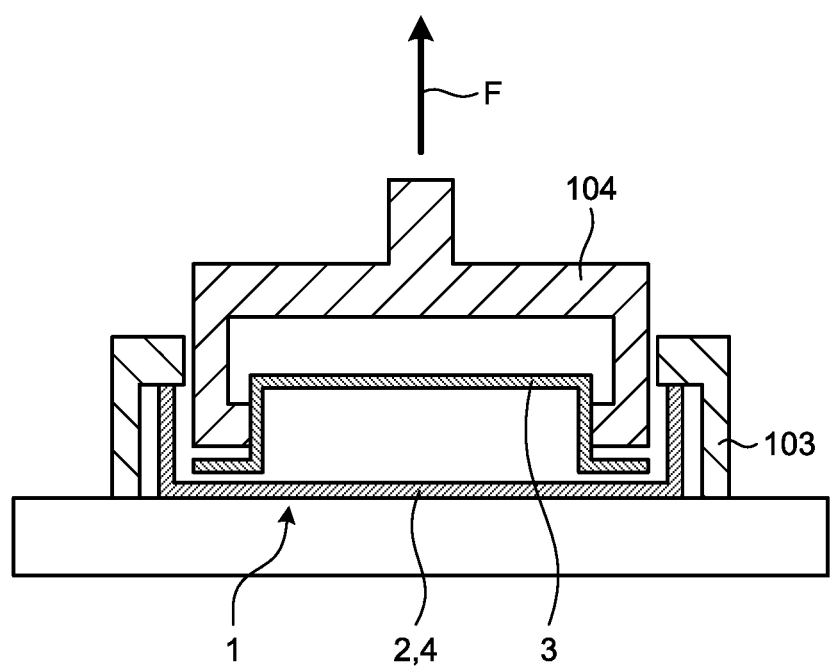
FIG. 10 is a schematic view for illustrating a peeling load test method.

The peeling load of the reinforcing structure was evaluated in accordance with "Testing methods for tensile strength of adhesive bonds" specified in JIS K6849 (1994). As test pieces in this test, housings obtained in examples and comparative examples were used. Here, for measuring the peeling strength of the reinforcing structure, evaluation was performed in a state in which there was not a top cover or bottom cover to which the reinforcing structure was not joined (before the reinforcing structure was joined). Specifically, as shown in FIG. 10, the bottom cover 2 or the top cover 4 of the housing 1 was fixed by a fixing tool 103, and the reinforcing structure 3 was fixed by a tensile tool 104. A tensile load F was applied while each member was fixed, and evaluation was performed until the reinforcing structure 3 was peeled off, or the tensile tool 104 was detached from the reinforcing structure 3. The bonding area here was calculated by measuring the width and length of the joining surface of the reinforcing structure 3 before joining. When joining was partially performed, the areas thereof were measured, and summed to determine a joining area. The peeling load of the reinforcing structure 3 was calculated from the resulting tensile load value and joining area. For the peeling load of the reinforcing structure 3 at 200° C., the housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the reinforcing structure 3, and evaluation was performed.
<Materials Used>

Materials used for evaluation are shown below.
[Material 1]

"TORAYCA" Prepreg P3252S-12 (manufactured by Toray Industries, Inc.) was provided as material 1. The properties of material 1 are shown in Table 1 below.
[Material 2]

SCF 183 EP-BL 3 manufactured by Super Resin Industry Co., Ltd. was provided as material 2. The properties of material 2 are shown in Table 1 below.
[Material 3]

An aluminum alloy A5052 was provided as material 3. The properties of material 3 are shown in Table 1 below.
[Material 4]

A magnesium alloy AZ31 was provided as material 4. The properties of material 4 are shown in Table 1 below.
[Material 5]

Using a master batch including 90% by mass of a polyamide 6 resin ("AMILAN" (registered trademark) CM1021T manufactured by Toray Industries, Inc.) and 10% by mass of a polyamide terpolymer resin composed of polyamide 6/66/610 ("AMILAN" (registered trademark) CM4000 manufactured by Toray Industries, Inc.), a thermoplastic resin film having a basis weight of 124 g/m$^2$ was prepared, and provided as material 5. The properties of material 5 are shown in Table 1 below.

TABLE 1

|  |  | Material 1 | Material 2 | Material 3 | Material 4 | Material 5 |
|---|---|---|---|---|---|---|
| Material | — | CFRP | GFRP | Al alloy | Mg alloy | Ny resin |
| Elastic modulus | GPa | 60 | 25 | 70 | 45 | 3.5 |
| Linear expansion coefficient | $10^{-6}$/° C. | 0.3 | 7 | 23.6 | 26 | 83 |
| Thermal conductivity | W/m · K | 3.0 | 0.3 | 236.0 | 159.0 | 0.3 |

Example 1

Example 1-(1): Preparation of Bottom Cover

Figure 11:
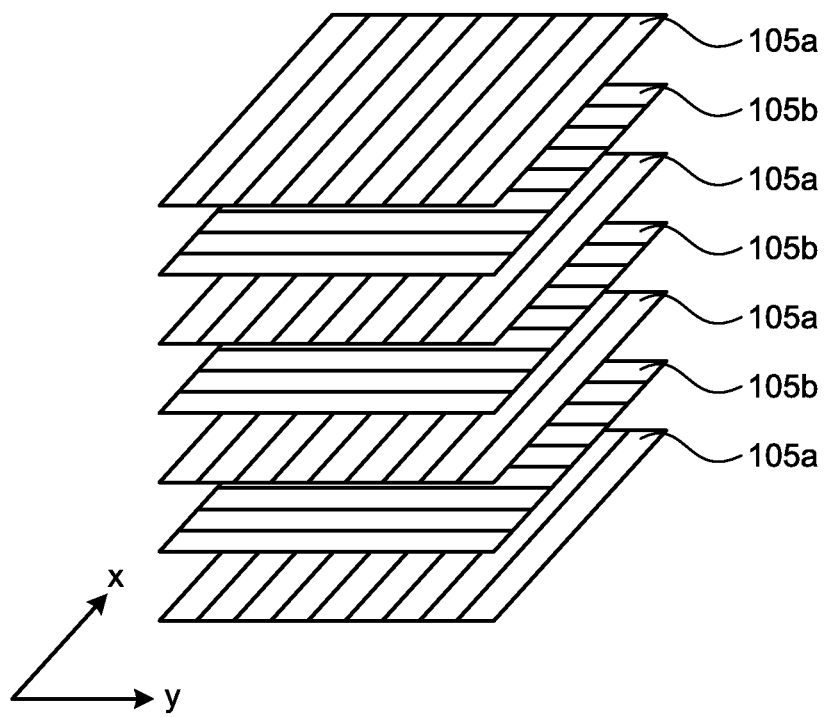
FIG. 11 is a schematic view showing a configuration of a laminate.

Seven sheets having a predetermined size were cut from material 1. Among them, four sheets were cut in such a manner that the fiber direction of a prepreg was parallel to a longitudinal direction (x direction in FIG. 1), and the other three sheets were cut in such a manner that the fiber direction was parallel to a lateral direction (y direction in FIG. 1). In this example, the lateral direction (y direction) was set to 0°, and as shown in FIG. 11, a laminate including seven prepreg sheets was prepared in such a manner that prepreg sheets 105a with the fiber direction set to 90° and prepreg sheets 105b with the fiber direction set to 0° were symmetrically laminated.

Here, a press molding apparatus and a pair of molds 106 as shown in FIG. 12(a) were used, and the resulting laminate 107 was disposed in a pair of molds 106. Here, the heating platen temperature of the press molding apparatus was set to 150° C., and as shown in FIG. 12(b), the molds 106 were moved, and the laminate was pressurized with the molding pressure kept at 1.0 MPa. After 30 minutes, the molds 106 were opened, and the molded article was removed from the molds 106. Trimming was performed in conformity to the height of the resulting molded article to obtain a bottom cover.

Example 1-(2): Preparation of Top Cover

Except that molds configured to prepare a molded article having a smooth shape were used, the same procedure as in Example 1-(1) was carried out to obtain a molded article. Trimming was performed so that the resulting molded article had a desired size, thereby obtaining a top cover.

Example 1-(3): Preparation of Reinforcing Structure

Figure 13:
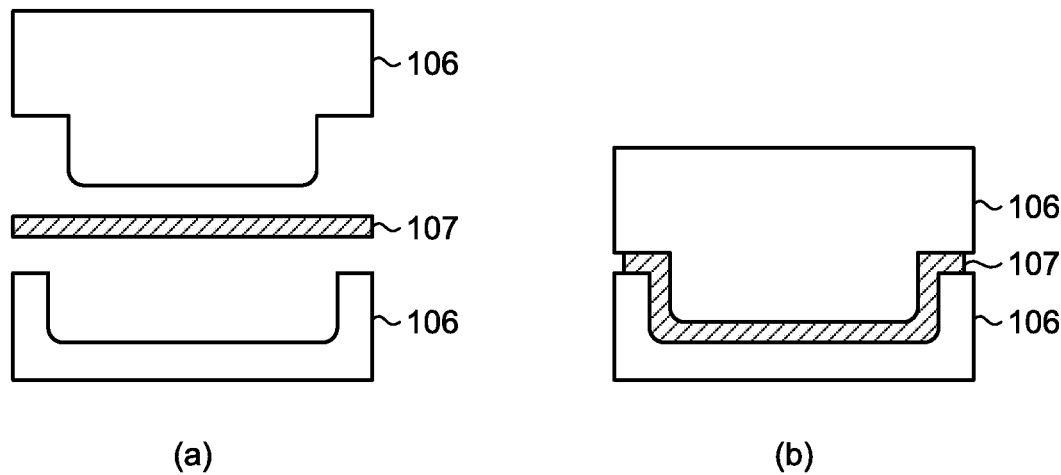
FIGS. 13(a) and 13(b) are schematic views for illustrating a press molding method.

Except that molds 106 as shown in FIG. 13 were used, the same procedure as in Example 1-(1) was carried out to obtain a molded article. Trimming was performed so that the joining surface of the resulting molded article had a desired width, thereby obtaining a reinforcing structure.

Example 1-(4): Preparation of Housing

Figure 14:
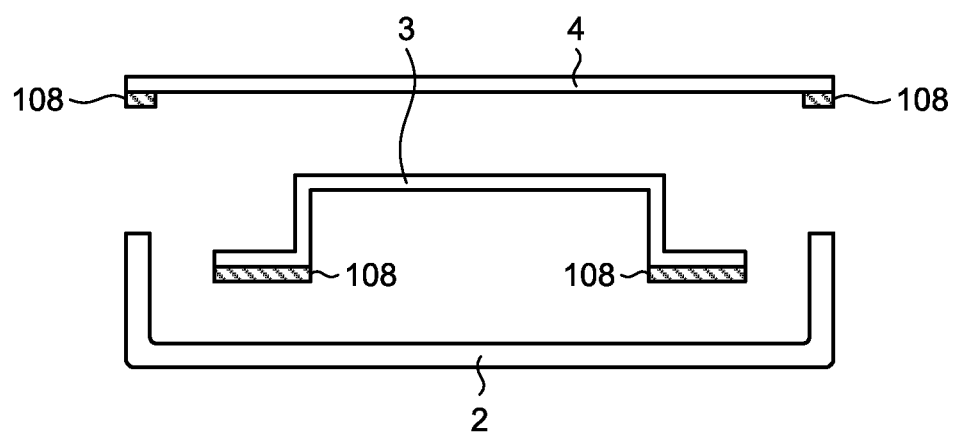
FIG. 14 is a schematic view for illustrating a method for preparing a housing.

The members obtained in Examples 1-(1) to 1-(3) were joined using an adhesive 108 as shown in FIG. 14. The molding conditions and evaluation results in Example 1 are shown in Table 2 below.

Example 2

Except that a bottom cover having a size as described in Table 2 was molded and used, the same procedure as in Examples 1-(1) to 1-(4) was carried out to obtain a housing. The molding conditions and evaluation results in Example 2 are shown in Table 2 below.

Example 3

Except that as the bottom cover, a material as described in Table 2 was used, the heating platen temperature was 220° C., and the molding pressure was 10 MPa, the same procedure as in Examples 1-(1) to 1-(4) was carried out to obtain a housing. The molding conditions and evaluation results in Example 3 are shown in Table 2 below.

Example 4

Except that as the bottom cover, a material as described in Table 2 was used, the heating platen temperature was 200° C., and the molding pressure was 10 MPa, the same procedure as in Examples 1-(1) to 1-(4) was carried out to obtain a housing. The molding conditions and evaluation results in Example 4 are shown in Table 2 below.

Example 5

Except that a bottom cover with a material as described in Table 3 was molded and used, the same procedure as in Examples 1-(1) to 1-(4) was carried out to obtain a housing. The molding conditions and evaluation results in Example 5 are shown in Table 3 below.

Example 6

Except that a reinforcing structure with a material as described in Table 3 was molded and used, the same procedure as in Examples 1-(1) to 1-(4) was carried out to obtain a housing. The molding conditions and evaluation results in Example 6 are shown in Table 3 below.

Example 7

Figure 7:
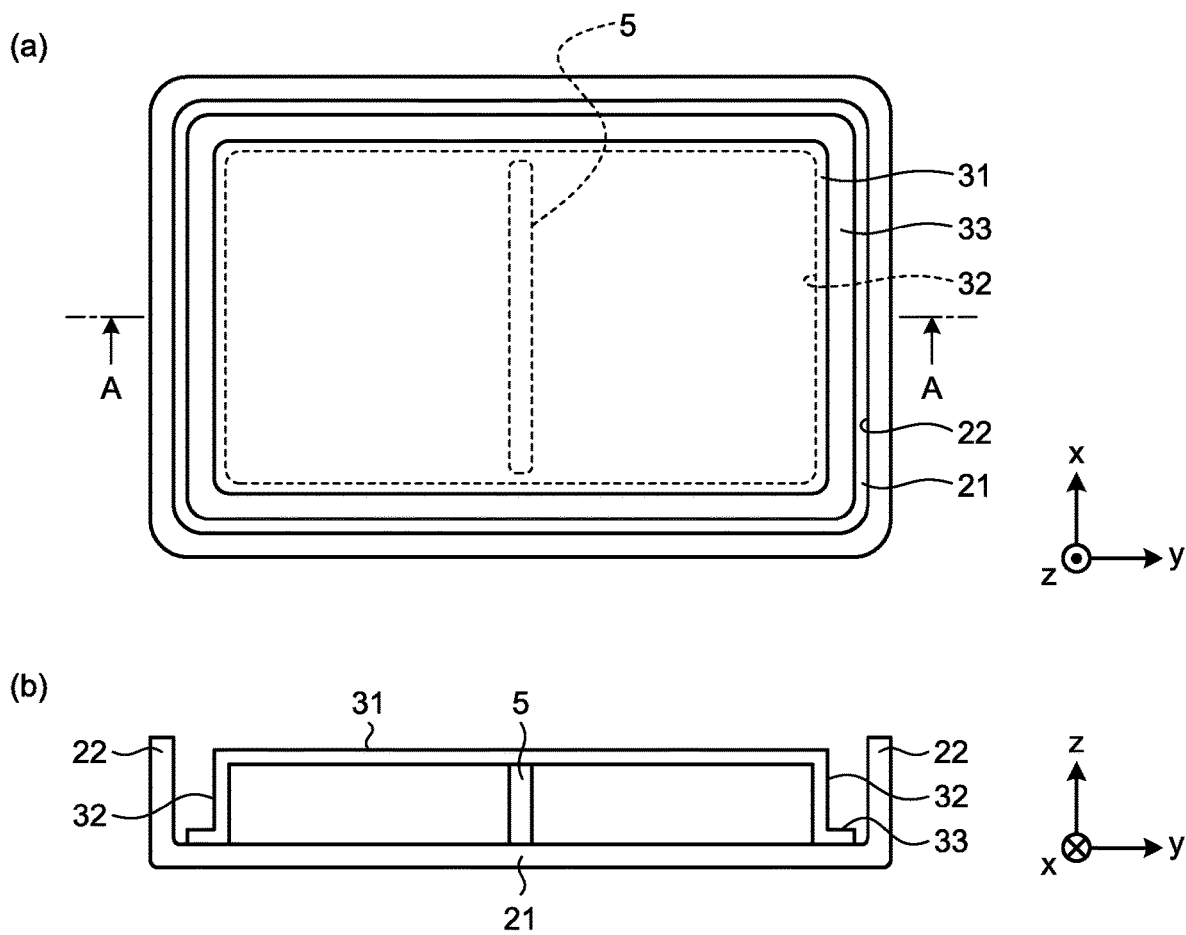
FIGS. 7(a) and 7(b) show a plan view and a sectional view showing a configuration of another reinforcing structure.

As another reinforcing structure, 25 sheets of material 1 were laminated so as to have a thickness of 3 mm with 0° prepreg sheets and 90° prepreg sheets being symmetrically laminated in an alternate manner. In the same manner as in Example 1-(1), the laminate was heated and pressurized by a press molding apparatus to obtain a molded article. The resulting molded article was processed so as to have a width of 7.2 mm, thereby obtaining another reinforcing structure having a size as shown in Table 3. The resulting another reinforcing structure was disposed as shown in FIG. 7, and joined by an adhesive, and subsequently the same procedure as in Examples 1-(1) to 1-(4) to obtain a housing. The molding conditions and evaluation results in Example 7 are shown in Table 3 below.

Example 8

Except that a reinforcing structure having a size as described in Table 3 was molded and used, the same procedure as in Examples 1-(1) to 1-(4) was carried out to obtain a housing. The molding conditions and evaluation results in Example 8 are shown in Table 3 below.

Example 9

A bottom cover and a reinforcing structure that were obtained in the same manner as in Examples 1-(1) and 1-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 1-(1) to 1-(4) was carried out to obtain a housing. The molding conditions and evaluation results in Example 9 are shown in Table 4 below.

Example 10

Example 10-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the reinforcing structure, thereby obtaining a laminate. Except that the resulting laminate was used, the same procedure as in Example 1-(1) was carried out to obtain a bottom cover.

Example 10-(2): Preparation of Top Cover

As in the case of Example 10-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 1-(2) was carried out to obtain a top cover.

Example 10-(3): Preparation of Reinforcing Structure

As in the case of Example 10-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 1-(3) was carried out to obtain a reinforcing structure.

Example 10-(4): Preparation of Housing

Figure 15:
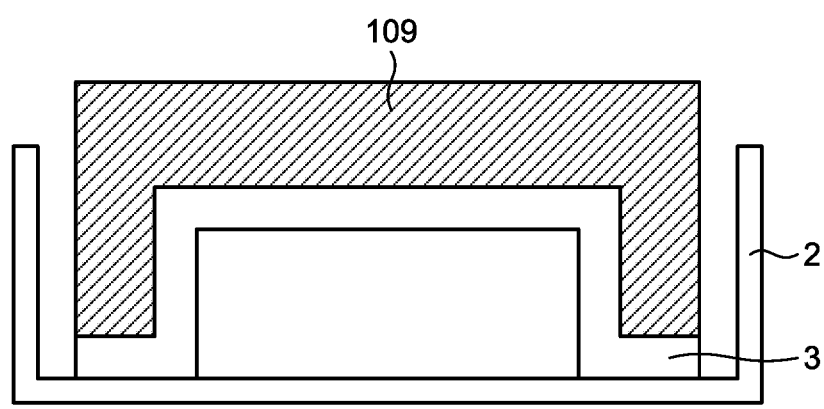
FIG. 15 is a schematic view for illustrating a method for preparing a housing.

The reinforcing structure obtained in Example 10-(3) and the bottom cover obtained in Example 10-(1) were superposed on each other in joined form, a joining tool 109 as shown in FIG. 15 was provided, and the joined bottom cover and reinforcing structure were disposed, and heated and pressurized in a press molding apparatus set so that the joining tool 109 had a surface temperature of 180° C. After 1 minute, the bottom cover 2, the reinforcing structure 3 and the joining tool 109 were taken out from the press molding apparatus, and cooled. After 5 minutes, the joining tool 109 was removed to obtain an integrated product of the bottom cover 2 and the reinforcing structure 3. Thereafter, the same procedure as in Example 1-(4) was carried out to obtain a housing. The molding conditions and evaluation results in Example 10 are shown in Table 4 below.

Example 11

Except that a reinforcing structure having a size as described in Table 4 was molded and used, the same procedure as in Example 10 was carried out to obtain a housing. The molding conditions and evaluation results in Example 11 are shown in Table 4 below.

Examples 12 to 14

Except that a reinforcing structure having a size as in Tables 4 and 5 was molded and used, the same procedure as in Example 10 was carried out to obtain a housing. The molding conditions and evaluation results in Examples 12 to 14 are shown in Tables 4 and 5 below.

Reference Example 1

Except that a size as described in Table 5 was employed, the same procedure as in Example 12 was carried out to obtain a bottom cover and a reinforcing structure. Electronic components were disposed in a hollow structure S1 formed by the bottom cover and the reinforcing structure, and a joining portion was joined by an ultrasonic welding machine in the same manner as in Example 12. In addition, as a top cover, a liquid crystal display was provided, and joined to a bottom cover by a double-sided tape. The molding conditions and evaluation results for the electronic device housing obtained in Reference Example 1 are shown in Table 5 below.

Comparative Example 1

Except that a reinforcing structure was not used, the same procedure as in Examples 1-(1) to 1-(4) was carried out to obtain a housing. The molding conditions and evaluation results in Comparative Example 1 are shown in Table 6 below.

Comparative Example 2

Except that a laminate obtained by laminating material 1 and material 2 was used as a material of a bottom cover, the same procedure as in Comparative Example 1 was carried out to obtain a housing. The molding conditions and evaluation results in Comparative Example 2 are shown in Table 6 below.

Comparative Example 3

Comparative Example 3-(1): Preparation of Bottom Cover

Figure 12:
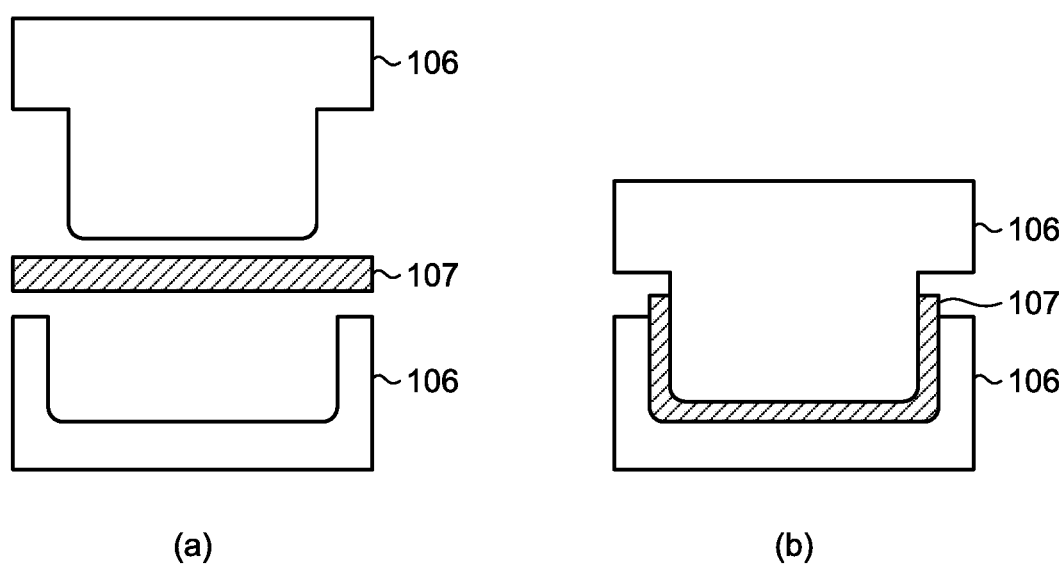
FIGS. 12(a) and 12(b) are schematic views for illustrating a press molding method.

A laminate obtained by laminating 10 sheets of material described in Table 6, a press molding apparatus, and a pair of molds 106 as shown in FIG. 12(*a*) were used. The laminate was disposed in a pair of molds 106. Here, the heating platen temperature of the press molding machine was set to 260° C., and the laminate was pressurized with the molding pressure kept at 1.0 MPa. After 10 minutes, cooling water was made to pass through the heating plate, so that cooling was started. After the mold temperature decreased to 100° C. or lower, the molds 106 were opened, and a molded article was taken out from the molds 106. Trimming was performed so that the rising wall of the resulting molded article had a desired height, thereby obtaining a bottom cover.

Comparative Example 3-(2): Preparation of Reinforcing Structure and Top Cover

Except that the mold to be used was changed so as to attain a size as described in Table 6, the same procedure as in Comparative Example 3-(1) was carried out to obtain a reinforcing structure and a top cover.

Comparative Example 3-(3): Preparation of Housing

Except that the resulting bottom cover and reinforcing structure were used, the same procedure as in Example 1-(4) was carried out to join a bottom cover using an adhesive. The molding conditions and evaluation results in Comparative Example 3 are shown in Table 6 below.
[Evaluation]

The housings obtained in examples were confirmed to exhibit high torsional rigidity and deflection rigidity. Among them, the housing of Example 1 exhibited very high torsional rigidity, and was also capable of mounting many electronic devices etc. in a hollow structure because the ratio of the hollow structure was high. It was confirmed that in Example 7, not only torsional rigidity but also further high deflection rigidity was exhibited due to the effect of another reinforcing structure. Examples 9 to 11 are preferable from the viewpoint of repair and recycling because the bottom cover and the reinforcing structure are joined to each other by heat welding, and therefore the joining portion can be disassembled by thermal while high torsional rigidity and deflection rigidity are exhibited. Examples 10 and 11 are preferable from the viewpoint of weight reduction because the reinforcing structure and the bottom cover are bonded directly to each other, and therefore an increase in weight is smaller as compared to a case where an adhesive or a hot melt resin is used.

In Examples 3 and 4, not only high torsional rigidity but also deflection rigidity was exhibited by using a metal material having high dynamic properties for the bottom cover. In addition, the metal material has a high thermal conductivity, and is therefore preferable from the viewpoint of thermal characteristics. Example 5 is preferable from the viewpoint of not only high torsional rigidity but also enabling radio wave communication because a non-conductive material having electromagnetic wave permeability is used for the bottom cover. Example 2 is intended to reduce the thickness of the bottom cover, and thus contributes to weight reduction and thickness reduction of the housing while maintaining torsional rigidity. In addition, Reference Example 1 was provided as a method for using a housing, where electronic components were disposed in a hollow structure to prepare an electronic device with a liquid crystal display used as atop cover. It was confirmed that when the requirements of the present invention were satisfied, it was possible to provide an electronic device exhibiting high torsional rigidity and deflection rigidity.

On the other hand, the housings of Comparative Examples 1 and 2 had very low resistance to torsion, so that there was the possibility of damaging internal electronic components. In Comparative Example 3, a reinforcing structure was used, but a resin material was used for each member, resulting in poor deflection rigidity.

TABLE 2

|  |  | Example 1 | Example 2 | Example 3 | Example 4 |
|---|---|---|---|---|---|
| Bottom cover: | | | | | |
| Material | — | Material 1 | Material 1 | Material 3 | Material 4 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.4 | 0.6 | 0.8 |
| Projected area | cm$^2$ | 630 | 630 | 630 | 630 |
| Volume | cm$^3$ | 572 | 601 | 586 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: | | | | | |
| Material | — | Material 2 | Material 2 | Material 2 | Material 2 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 412 | 412 | 412 |
| Another reinforcing structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 92.1 | 92.1 | 92.1 | 92.1 |
| Volume ratio | % | 72.0 | 68.6 | 70.2 | 72.0 |
| Integration method | — | Adhesive | Adhesive | Adhesive | Adhesive |

TABLE 2-continued

|  |  | Example 1 | Example 2 | Example 3 | Example 4 |
|---|---|---|---|---|---|
| Bonding portion | — | Plane | Plane | Plane | Plane |
| Peeling load (23° C.) | N/cm² | 1500 | 1500 | 1500 | 1500 |
| Peeling load (200° C.) | N/cm² | 700 | 700 | 700 | 700 |
| Evaluation |  |  |  |  |  |
| Torsional rigidity | — | ⊙ | ⊙ | ⊙ | ○ |
| Deflection rigidity | — | ○ | ○ | ○ | ○ |

TABLE 3

|  |  | Example 5 | Example 6 | Example 7 | Example 8 |
|---|---|---|---|---|---|
| Bottom cover: |  |  |  |  |  |
| Material | — | Material 2 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | cm² | 630 | 630 | 630 | 630 |
| Volume | cm³ | 572 | 572 | 572 | 572 |
| Top cover: |  |  |  |  |  |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm² | 630 | 630 | 630 | 630 |
| Volume | cm³ | — | — | — | — |
| Reinforcing structure: |  |  |  |  |  |
| Material | — | Material 2 | Material 1 | Material 2 | Material 2 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 45 |
| Thickness | mm | 0.8 | 0.8 | 0.8 | 0.8 |
| Overlap width | mm | 5 | 5 | 5 | 5 |
| Bonding area | cm² | 48 | 48 | 48 | 48 |
| Projected area | cm² | 580 | 580 | 580 | 580 |
| Volume | cm³ | 412 | 412 | 412 | 412 |
| Another reinforcing structure |  |  |  |  |  |
| Material | — | — | — | Material 1 | — |
| Length | mm | — | — | 188 | — |
| Width | mm | — | — | 3 | — |
| Height | mm | — | — | 4 | — |
| Electronic device housing |  |  |  |  |  |
| Projected area ratio | % | 92.1 | 92.1 | 92.1 | 92.1 |
| Volume ratio | % | 72.0 | 72.0 | 72.0 | 72.0 |
| Integration method | — | Adhesive | Adhesive | Adhesive | Adhesive |
| Bonding portion | — | Plane | Plane | Plane | Plane |
| Peeling load (23° C.) | N/cm² | 1500 | 1500 | 1500 | 1500 |
| Peeling load (200° C.) | N/cm² | 700 | 700 | 700 | 700 |
| Evaluation |  |  |  |  |  |
| Torsional rigidity | — | ⊙ | ⊙ | ⊙ | ○ |
| Deflection rigidity | — | ○ | ○ | ○ | ○ |

TABLE 4

|  |  | Example 9 | Example 10 | Example 11 | Example 12 |
|---|---|---|---|---|---|
| Bottom cover: |  |  |  |  |  |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | cm² | 630 | 630 | 630 | 630 |
| Volume | cm³ | 572 | 572 | 572 | 572 |
| Top cover: |  |  |  |  |  |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm² | 630 | 630 | 630 | 630 |
| Volume | cm³ | — | — | — | — |
| Reinforcing structure: |  |  |  |  |  |
| Material | — | Material 2 | Material 2 | Material 2 | Material 2 |
| Length | mm | 200 | 200 | 200 | 200 |
| Width | mm | 290 | 290 | 290 | 290 |
| Height | mm | 8 | 8 | 8 | 2 |
| Angle | ° | 90 | 90 | 45 | 90 |
| Thickness | mm | 0.8 | 0.8 | 0.8 | 0.8 |
| Overlap width | mm | 5 | 5 | 5 | 5 |
| Bonding area | cm² | 48 | 48 | 48 | 48 |
| Projected area | cm² | 580 | 580 | 580 | 580 |
| Volume | cm³ | 412 | 412 | 412 | 69 |
| Another reinforcing structure |  |  |  |  |  |
| Material | — | — | — | — | — |
| Length | mm | — | — | — | — |
| Width | mm | — | — | — | — |
| Height | mm | — | — | — | — |
| Electronic device housing |  |  |  |  |  |
| Projected area ratio | % | 92.1 | 92.1 | 92.1 | 92.1 |
| Volume ratio | % | 72.0 | 72.0 | 72.0 | 12.0 |
| Integration method | — | Thermal welding | Thermal welding | Thermal welding | Thermal welding |
| Bonding portion | — | Plane | Plane | Plane | Plane |
| Peeling load (23° C.) | N/cm² | 2000 | 2500 | 2500 | 2500 |
| Peeling load (200° C.) | N/cm² | 50 | 50 | 50 | 50 |
| Evaluation |  |  |  |  |  |
| Torsional rigidity | — | ⊙ | ⊙ | ○ | ○ |
| Deflection rigidity | — | ○ | ○ | ○ | ○ |

TABLE 5

|  |  | Example 13 | Example 14 | Reference Example 1 |
|---|---|---|---|---|
| Bottom cover: |  |  |  |  |
| Material | — | Material 1 | Material 1 | Material 1 |
| Length | mm | 210 | 210 | 180 |
| Width | mm | 300 | 300 | 230 |
| Height | mm | 10 | 10 | 7 |
| Thickness | mm | 0.8 | 0.8 | 0.8 |
| Projected area | cm² | 630 | 630 | 414 |
| Volume | cm³ | 572 | 572 | 253 |

TABLE 5-continued

|  |  | Example 13 | Example 14 | Reference Example 1 |
|---|---|---|---|---|
| Top cover: |  |  |  |  |
| Material | — | Material 1 | Material 1 | Display |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | cm$^2$ | 630 | 630 | 630 |
| Volume | cm$^3$ | — | — | — |
| Reinforcing structure: |  |  |  |  |
| Material | — | Material 2 | Material 2 | Material 2 |
| Length | mm | 200 | 206 | 162 |
| Width | mm | 290 | 296 | 215 |
| Height | mm | 3 | 8 | 5 |
| Angle | ° | 90 | 90 | 90 |
| Thickness | mm | 0.8 | 0.8 | 0.5 |
| Overlap width | mm | 5 | 5 | 5 |
| Bonding area | cm$^2$ | 48 | 49 | 37 |
| Projected area | cm$^2$ | 580 | 610 | 348 |
| Volume | cm$^3$ | 126 | 433 | 155 |
| Another reinforcing structure |  |  |  |  |
| Material | — | — | — | — |
| Length | mm | — | — | — |
| Width | mm | — | — | — |
| Height | mm | — | — | — |
| Electronic device housing |  |  |  |  |
| Projected area ratio | % | 92.1 | 96.8 | 84.1 |
| Volume ratio | % | 22.0 | 75.7 | 61.4 |
| Integration method | — | Thermal welding | Thermal welding | Thermal welding |
| Bonding portion | — | Plane | Plane | Plane |
| Peeling load (23° C.) | N/cm$^2$ | 2500 | 2500 | 2500 |
| Peeling load (200° C.) | N/cm$^2$ | 50 | 50 | 50 |
| Evaluation |  |  |  |  |
| Torsional rigidity | — | ○ | ⊙ | ⊙ |
| Deflection rigidity | — | ○ | ○ | ○ |

TABLE 6

|  |  | Comparative Example 1 | Comparative Example 2 | Comparative Example 3 |
|---|---|---|---|---|
| Bottom cover: |  |  |  |  |
| Material | — | Material 1 | Material 1/Material 2 | Material 5 |
| Length | mm | 210 | 210 | 210 |
| Width | mm | 300 | 300 | 300 |
| Height | mm | 10 | 10 | 10 |
| Thickness | mm | 0.8 | 1.6 | 0.8 |
| Projected area | cm$^2$ | 630 | 630 | 630 |
| Volume | cm$^3$ | 572 | 516 | 572 |
| Top cover: |  |  |  |  |
| Material | — | Material 1 | Material 1 | Material 5 |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | cm$^2$ | 630 | 630 | 630 |
| Volume | cm$^3$ | — | — | — |

TABLE 6-continued

|  |  | Comparative Example 1 | Comparative Example 2 | Comparative Example 3 |
|---|---|---|---|---|
| Reinforcing structure: |  |  |  |  |
| Material | — | — | — | Material 5 |
| Length | mm | — | — | 200 |
| Width | mm | — | — | 290 |
| Height | mm | — | — | 8 |
| Angle | ° | — | — | 90 |
| Thickness | mm | — | — | 0.8 |
| Overlap width | mm | — | — | 5 |
| Bonding area | cm$^2$ | — | — | 48 |
| Projected area | cm$^2$ | — | — | 580 |
| Volume | cm$^3$ | — | — | 412 |
| Another reinforcing structure |  |  |  |  |
| Material | — | — | — | — |
| Length | mm | — | — | — |
| Width | mm | — | — | — |
| Height | mm | — | — | — |
| Electronic device housing |  |  |  |  |
| Projected area ratio | % | 0.0 | 0.0 | 92.1 |
| Volume ratio | % | 0.0 | 0.0 | 72.0 |
| Integration method | — | — | — | Adhesive |
| Bonding portion | — | — | — | Plane |
| Peeling load (23° C.) | N/cm$^2$ | — | — | 1500 |
| Peeling load (200° C.) | N/cm$^2$ | — | — | 50 |
| Evaluation |  |  |  |  |
| Torsional rigidity | — | X | X | ○ |
| Deflection rigidity | — | X | ○ | Δ |

Hereinafter, third and fourth aspects of the present invention will be described in detail by way of examples. However, the present invention is not limited to the following examples.

<Evaluation and Measurement Methods>

(1) Torsional Rigidity Test

Figure 8:
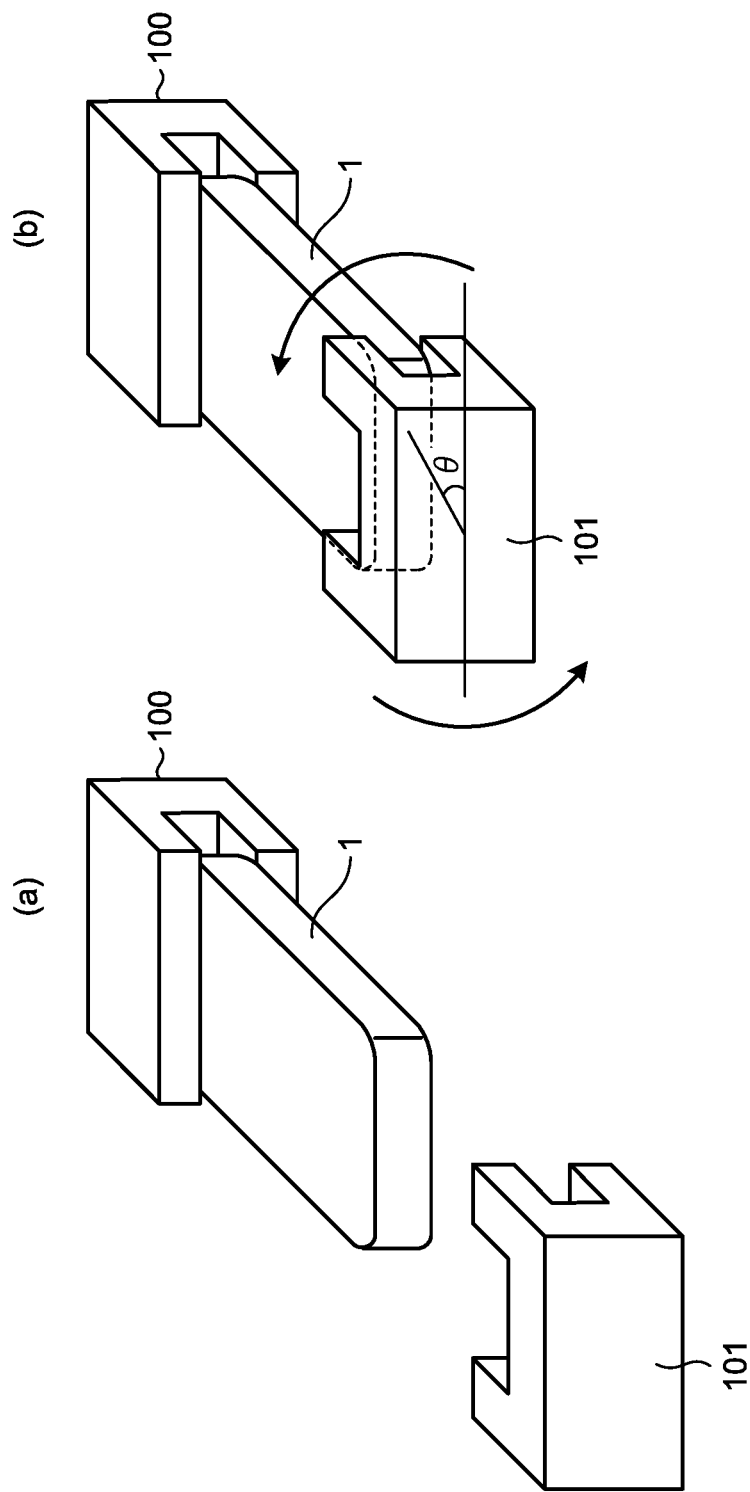
FIGS. 8(a) and 8(b) are schematic views for illustrating a torsional rigidity test method.
Figure 9:
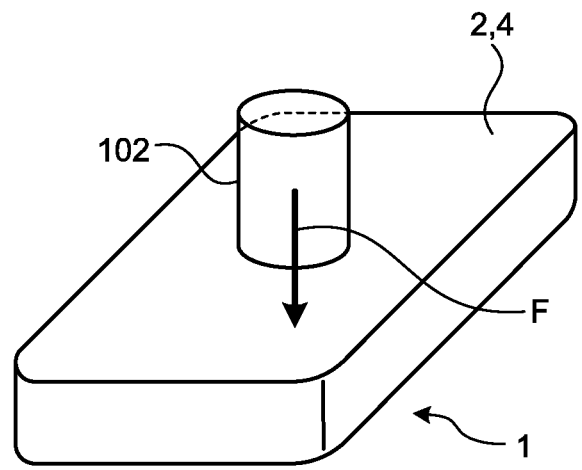
FIG. 9 is a schematic view for illustrating a deflection rigidity test method.

A housing 1 was fixed in a tester in such a manner that one side of the housing 1 was fixed by a U-shaped fixing tool 100, and the other side opposed to the fixed side was held by a support tool 101 as shown in FIG. 8(*a*), the displacement amount of the housing 1 was then measured when a load of 10 N was applied with a change rate set to 1°/min at an angle θ as shown in FIG. 8(*b*), and the measured value was defined as a torsional rigidity value of the housing.

(2) Deflection Rigidity Test

As shown in FIG. 9, the housing was installed in a tester in such a manner that it was able to apply a load F from the side of a bottom cover 2 or a top cover 4 to which a reinforcing structure was joined. "Instron" (registered trademark) Universal Tester Model 4201 (manufactured by Instron Co., Ltd.) was used as a tester. The deflection amount of the bottom cover 2 or the top cover 4 was measured when a load of 100 N was applied with the housing 1 pressed at the center position at a cross head speed of 1.0 mm/min using an indenter 102 having a diameter of 20 mm, and the measured value was defined as a deflection rigidity value.

(3) Evaluation of Flexural Modulus

In accordance with the specifications in ASTM D-790 (1997), the flexural moduli of materials to be used for the reinforcing structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. "Instron" (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.

(4) Peeling Load Test of Reinforcing Structure (23° C. and 200° C.)

The peeling load of the reinforcing structure was evaluated in accordance with "Testing methods for tensile strength of adhesive bonds" specified in JIS K6849 (1994). As test pieces in this test, housings obtained in examples and comparative examples were used. Here, for measuring the peeling strength of the reinforcing structure, evaluation was performed in a state in which there was not a top cover or bottom cover to which the reinforcing structure was not joined (before the reinforcing structure was joined). Specifically, as shown in FIG. 10, the bottom cover 2 or the top cover 4 of the housing 1 was fixed by a fixing tool 103, and the reinforcing structure 3 was fixed by a tensile tool 104. A tensile load F was applied while each member was fixed, and evaluation was performed until the reinforcing structure 3 was peeled off, or the tensile tool 104 was detached from the reinforcing structure 3. The bonding area here was calculated by measuring the width and length of the joining surface of the reinforcing structure 3 before joining. When joining was partially performed, the areas thereof were measured, and summed to determine a joining area. The peeling load of the reinforcing structure 3 was calculated from the resulting tensile load value and joining area. For the peeling load of the reinforcing structure 3 at 200° C., housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the reinforcing structure 3, and evaluation was performed.

<Materials Used>

Materials used for evaluation are shown below.

[Material 11]

"TORAYCA" Prepreg P3252S-12 (manufactured by Toray Industries, Inc.) was provided as material 11. The properties of material 11 are shown in Table 7 below.

[Material 12]

SCF 183 EP-BL 3 manufactured by Super Resin Industry Co., Ltd. was provided as material 12. The properties of material 12 are shown in Table 7 below.

[Material 13]

An aluminum alloy A5052 was provided as material 13. The properties of material 13 are shown in Table 7 below.

[Material 14]

A magnesium alloy AZ31 was provided as material 14. The properties of material 14 are shown in Table 7 below.

[Material 15]

A titanium alloy Ti-6A1-4V was provided as material 15. The properties of material 15 are shown in Table 7 below.

[Material 16]

Using a master batch including 90% by mass of a polyamide 6 resin ("AMILAN" (registered trademark) CM1021T manufactured by Toray Industries, Inc.) and 10% by mass of a polyamide terpolymer resin composed of polyamide 6/66/610 ("AMILAN" (registered trademark) CM4000 manufactured by Toray Industries, Inc.), a thermoplastic resin film having a basis weight of 124 g/m$^2$ was prepared, and provided as material 16. The properties of material 16 are shown in Table 7 below.

TABLE 7

|  |  | Material 11 | Material 12 | Material 13 | Material 14 | Material 15 | Material 16 |
|---|---|---|---|---|---|---|---|
| Material | — | CFRP | GFRP | Al alloy | Mg alloy | Ti alloy | Ny resin |
| Elastic modulus | GPa | 60 | 25 | 70 | 45 | 113 | 3.5 |
| Linear expansion coefficient | 10$^{-6}$/° C. | 0.3 | 7 | 23.6 | 26 | 8.2 | 83 |
| Thermal conductivity | W/m · K | 3.0 | 0.3 | 236.0 | 159.0 | 22.0 | 0.3 |

Example 21

Example 21-(1): Preparation of Bottom Cover

Seven sheets having a predetermined size were cut from material 11. Among them, four sheets were cut in such a manner that the fiber direction of a prepreg was parallel to a longitudinal direction (x direction in FIG. 1), and the other three sheets were cut in such a manner that the fiber direction was parallel to a lateral direction (y direction in FIG. 1). In this example, the lateral direction (y direction) was set to 0°, and as shown in FIG. 11, a laminate including seven prepreg sheets was prepared in such a manner that prepreg sheets 105a with the fiber direction set to 90° and prepreg sheets 105b with the fiber direction set to 0° were symmetrically laminated.

Here, a press molding apparatus and a pair of molds 106 as shown in FIG. 12(*a*) were used, and the resulting laminate 107 was disposed in a pair of molds 106. Here, the heating platen temperature of the press molding apparatus was set to 150° C., and as shown in FIG. 12(*b*), the molds 106 were moved, and the laminate was pressurized with the molding pressure kept at 1.0 MPa. After 30 minutes, the molds 106 were opened, and the molded article was removed from the molds 106. Trimming was performed so that the rising wall of the resulting molded article had a desired height, thereby obtaining a bottom cover.

Example 21-(2): Preparation of Top Cover

Except that molds configured to prepare a molded article having a smooth shape were used, the same procedure as in Example 21-(1) was carried out to obtain a molded article.

Trimming was performed so that the resulting molded article had a desired size, thereby obtaining a top cover.

Example 21-(3): Preparation of Reinforcing Structure

Except that molds 106 as shown in FIG. 13 were used, the same procedure as in Example 21-(1) was carried out to obtain a molded article. Trimming was performed so that the joining surface of the resulting molded article had a desired width, thereby obtaining a reinforcing structure.

Example 21-(4): Preparation of Housing

The members obtained in Examples 21-(1) to 21-(3) were joined using an adhesive 108 as shown in FIG. 14. The molding conditions and evaluation results in Example 21 are shown in Table 8 below.

Example 22

Except that a reinforcing structure with a material as described in Table 8 was molded and used, the same procedure as in Examples 21-(1) to 21-(4) was carried out to obtain a housing. The molding conditions and evaluation results in Example 22 are shown in Table 8 below.

Example 23

Except that a bottom cover having a size as described in Table 8 was used, the same procedure as in Example 22 was carried out to obtain a housing. The molding conditions and evaluation results in Example 23 are shown in Table 8 below.

Example 24

Except that as the reinforcing structure, a material as described in Table 8 was used, the heating platen temperature was 220° C., and the molding pressure was 10 MPa, the same procedure as in Examples 21-(1) to 21-(4) was carried out to obtain a housing. The molding conditions and evaluation results in Example 24 are shown in Table 8 below.

Example 25

Except that as the bottom cover, a material as described in Table 9 was used, the heating platen temperature was 200° C., and the molding pressure was 10 MPa, the same procedure as in Examples 21-(1) to 21-(4) was carried out to obtain a housing. The molding conditions and evaluation results in Example 25 are shown in Table 9 below.

Example 26

Except that as the bottom cover, a material as described in Table 9 was used, the heating platen temperature was 240° C., and the molding pressure was 10 MPa, the same procedure as in Examples 21-(1) to 21-(4) was carried out to obtain a housing. The molding conditions and evaluation results in Example 26 are shown in Table 9 below.

Example 27

Except that a reinforcing structure having a size as described in Table 9 was molded and used, the same procedure as in Examples 21-(1) to 21-(4) was carried out to obtain a housing. The molding conditions and evaluation results in Example 27 are shown in Table 9 below.

Example 28

As another reinforcing structure, 25 sheets of material 11 were laminated so as to have a thickness of 3 mm with prepreg sheets and 90° prepreg sheets being symmetrically laminated in an alternate manner. In the same manner as in Example 21-(1), the laminate was heated and pressurized by a press molding apparatus to obtain a molded article. The resulting molded article was processed so as to have a height of 7.2 mm, thereby obtaining another reinforcing structure having a size as shown in Table 9. The resulting another reinforcing structure was disposed as shown in FIG. 7, and joined by an adhesive, and subsequently the same procedure as in Examples 21-(1) to 21-(4) to obtain a housing. The molding conditions and evaluation results in Example 28 are shown in Table 9 below.

Example 29

A bottom cover and a reinforcing structure that were obtained in the same manner as in Examples 21-(1) and 21-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 21-(1) to 21-(4) was carried out to obtain a housing. The molding conditions and evaluation results in Example 29 are shown in Table 10 below.

Example 30

Example 30-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the reinforcing structure, thereby obtaining a laminate. Except that the resulting laminate was used, the same procedure as in Example 21-(1) was carried out to obtain a bottom cover.

Example 30-(2): Preparation of Top Cover

As in the case of Example 30-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 21-(2) was carried out to obtain a top cover.

Example 30-(3): Preparation of Reinforcing Structure

As in the case of Example 30-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 21-(3) was carried out to obtain a reinforcing structure.

Example 30-(4): Preparation of Housing

The reinforcing structure obtained in Example 30-(3) was superposed in a joined form on the bottom cover obtained in Example 30-(1) were superposed on each other in joined form, a joining tool 109 as shown in FIG. 15 was provided, and the joined bottom cover and reinforcing structure were disposed, and heated and pressurized in a press molding apparatus set so that the joining tool 109 had a surface temperature of 180° C. After 1 minute, the bottom cover 2, the reinforcing structure 3 and the joining tool 109 were taken out from the press molding apparatus, and cooled. After 5 minutes, the joining tool 109 was removed to obtain an integrated product of the bottom cover 2 and the reinforcing structure 3. Thereafter, the same procedure as in Examples 21-(1) to 21-(4) was carried out to obtain a housing. The molding conditions and evaluation results in Example 30 are shown in Table 10 below.

Example 31

Except that a bottom cover and a top cover were prepared and used as in the same manner as in Example 30, the same procedure as in Example 24 was carried out to obtain a material. In the same manner as in Example 30-(4), members were joined to obtain a housing. The molding conditions and evaluation results in Example 31 are shown in Table 10 below.

Example 32

Except that a bottom cover, a top cover and a reinforcing structure were obtained as in the same manner as in Example 30, the same procedure as in Example 28 was carried out to obtain a material. In the same manner as in Example 30-(4), members were joined to obtain a housing. The molding conditions and evaluation results in Example 32 are shown in Table 10 below.

Examples 33 to 35

Except that a reinforcing structure having a size as in Table 11 was molded and used, the same procedure as in Example 30 was carried out to obtain a housing. The molding conditions and evaluation results in Examples 33 to 35 are shown in Table 11 below.

Reference Example 11

Except that a size as described in Table 11 was employed, the same procedure as in Example 32 was carried out to obtain a bottom cover and a reinforcing structure. Electronic components were disposed in a hollow structure S1 formed by the bottom cover and the reinforcing structure, and a joining portion was joined by an ultrasonic welding machine in the same manner as in Example 30. In addition, as a top cover, a liquid crystal display was provided, and joined to a bottom cover by a double-sided tape. The molding conditions and evaluation results for the electronic device housing obtained in Reference Example 11 are shown in Table 11 below.

Comparative Example 11

Except that a reinforcing structure was not used, the same procedure as in Examples 21-(1) to 21-(4) was carried out to obtain a housing. The molding conditions and evaluation results in Comparative Example 11 are shown in Table 12 below.

Comparative Example 12

Except that a laminate obtained by laminating material 11 and material 12 was used as a material of a bottom cover, the same procedure as in Comparative Example 11 was carried out to obtain a housing. The molding conditions and evaluation results in Comparative Example 12 are shown in Table 12 below.

Comparative Example 13

Comparative Example 13-(1): Preparation of Bottom Cover

A laminate obtained by laminating 10 sheets of material described in Table 12, a press molding apparatus, and a pair of molds 106 as shown in FIG. 12(a) were used. The laminate was disposed in a pair of molds 106. Here, the heating platen temperature of the press molding apparatus was set to 260° C., and the laminate was pressurized with the molding pressure kept at 1.0 MPa. After 10 minutes, cooling water was made to pass through the heating plate, so that cooling was started. After the mold temperature decreased to 100° C. or lower, the molds 106 were opened, and a molded article was taken out from the molds 106. Trimming was performed so that the rising wall of the resulting molded article had a desired height, thereby obtaining a bottom cover.

Comparative Example 13-(2): Preparation of Reinforcing Structure and Top Cover

Except that the mold to be used was changed so as to attain a size as described in Table 12, the same procedure as in Comparative Example 13-(1) was carried out to obtain a reinforcing structure and a top cover.

Comparative Example 13-(3): Preparation of Housing

Except that the resulting bottom cover and reinforcing structure were used, the same procedure as in Example 21-(4) was carried out to join a bottom cover using an adhesive. The molding conditions and evaluation results in Comparative Example 13 are shown in Table 12 below.

[Evaluation]

The housings obtained in examples were confirmed to exhibit high torsional rigidity. Among them, the housing of Example 21 exhibited very high torsional rigidity, and was also capable of mounting many electronic devices etc. in a hollow structure because the ratio of the hollow structure was high. It was confirmed that in Examples 28 and 32, not only torsional rigidity but also deflection rigidity was exhibited due to the effect of another reinforcing structure. In addition, Examples 29 to 32 are preferable from the viewpoint of repair and recycling because the top cover and the reinforcing structure are joined to each other by thermal welding, and therefore the joining portion can be disassembled by heating while high torsional rigidity and deflection rigidity are exhibited. Examples 30 to 32 are preferable from the viewpoint of weight reduction because the reinforcing structure and the bottom cover are bonded directly to each other, and therefore an increase in weight is smaller as compared to a case where an adhesive or a hot melt resin is used.

Examples 33 and 34 are intended to reduce the thickness of each member, and thus contributes to weight reduction and thickness reduction of the housing while maintaining torsional rigidity. In addition, Reference Example 11 was provided as a method for using a housing, where electronic components were disposed in a hollow structure to prepare an electronic device with a liquid crystal display used as a top cover. It was confirmed that when the requirements of the present invention were satisfied, it was possible to provide a housing exhibiting high torsional rigidity and deflection rigidity.

On the other hand, the housings of Comparative Examples 11 and 12 had very low resistance to torsion, so that there was the possibility of damaging internal electronic components. In Comparative Example 13, a reinforcing structure was used, but the requirements of the present invention were not satisfied, and it was impossible to exhibit satisfactory deflection rigidity.

TABLE 8

|  |  | Example 21 | Example 22 | Example 23 | Example 24 |
|---|---|---|---|---|---|
| Bottom cover: |  |  |  |  |  |
| Material | — | Material 11 | Material 11 | Material 11 | Material 11 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.4 | 0.8 |
| Projected area | $cm^2$ | 630 | 630 | 630 | 630 |
| Volume | $cm^3$ | 572 | 572 | 601 | 572 |
| Top cover: |  |  |  |  |  |
| Material | — | Material 11 | Material 11 | Material 11 | Material 11 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: |  |  |  |  |  |
| Material | — | Material 12 | Material 11 | Material 11 | Material 13 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.6 |
| Overlap width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 412 | 425 |
| Another reinforcing structure |  |  |  |  |  |
| Material | — | — | — | — | — |
| Length | mm | — | — | — | — |
| Width | mm | — | — | — | — |
| Height | mm | — | — | — | — |
| Electronic device housing |  |  |  |  |  |
| Projected area ratio | % | 92.1 | 92.1 | 92.1 | 92.1 |
| Volume ratio | % | 72.0 | 72.0 | 68.6 | 74.3 |
| Integration method | — | Adhesive | Adhesive | Adhesive | Adhesive |
| Bonding portion | — | Plane | Plane | Plane | Plane |
| Peeling load (23° C.) | $N/cm^2$ | 1500 | 1500 | 1500 | 1500 |
| Peeling load (200° C.) | $N/cm^2$ | 700 | 700 | 700 | 700 |
| Evaluation |  |  |  |  |  |
| Torsional rigidity | — | ⊙ | ⊙ | ⊙ | ⊙ |
| Deflection rigidity | — | ○ | ○ | ○ | ○ |

TABLE 9

| | | Example 25 | Example 26 | Example 27 | Example 28 |
|---|---|---|---|---|---|
| Bottom cover: | | | | | |
| Material | — | Material 11 | Material 11 | Material 11 | Material 11 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | cm$^2$ | 630 | 630 | 630 | 630 |
| Volume | cm$^3$ | 572 | 572 | 572 | 572 |
| Top cover: | | | | | |
| Material | — | Material 11 | Material 11 | Material 11 | Material 11 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: | | | | | |
| Material | — | Material 14 | Material 15 | Material 12 | Material 12 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.2 | 0.4 | 0.8 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 451 | 438 | 412 |
| Another reinforcing structure | | | | | |
| Material | — | — | — | — | Material 11 |
| Length | mm | — | — | — | 188 |
| Width | mm | — | — | — | 3 |
| Height | mm | — | — | — | 4 |
| Electronic device housing | | | | | |
| Projected area ratio | % | 92.1 | 92.1 | 92.1 | 92.1 |
| Volume ratio | % | 72.0 | 78.8 | 76.5 | 72.0 |
| Integration method | — | Adhesive | Adhesive | Adhesive | Adhesive |
| Bonding portion | — | Plane | Plane | Plane | Plane |
| Peeling load (23° C.) | N/cm$^2$ | 1500 | 1500 | 1500 | 1500 |
| Peeling load (200° C.) | N/cm$^2$ | 700 | 700 | 700 | 700 |
| Evaluation | | | | | |
| Torsional rigidity | — | ⊙ | ⊙ | ⊙ | ⊙ |
| Deflection rigidity | — | ○ | ○ | ○ | ⊙ |

TABLE 10

| | | Example 29 | Example 30 | Example 31 | Example 32 |
|---|---|---|---|---|---|
| Bottom cover: | | | | | |
| Material | — | Material 11 | Material 11 | Material 11 | Material 11 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | cm$^2$ | 630 | 630 | 630 | 630 |
| Volume | cm$^3$ | 572 | 572 | 572 | 572 |
| Top cover: | | | | | |
| Material | — | Material 11 | Material 11 | Material 11 | Material 11 |
| Length | mm | 210 | 210 | 210 | 210 |

TABLE 10-continued

|  |  | Example 29 | Example 30 | Example 31 | Example 32 |
|---|---|---|---|---|---|
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: |  |  |  |  |  |
| Material | — | Material 12 | Material 12 | Material 12 | Material 12 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.6 | 0.8 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 412 | 425 | 412 |
| Reinforcing structure: structure |  |  |  |  |  |
| Material | — | — | — | — | Material 11 |
| Length | mm | — | — | — | 188 |
| Width | mm | — | — | — | 3 |
| Height | mm | — | — | — | 4 |
| Electronic device housing |  |  |  |  |  |
| Projected area ratio | % | 92.1 | 92.1 | 92.1 | 92.1 |
| Volume ratio | % | 72.0 | 72.0 | 74.3 | 72.0 |
| Integration method | — | Thermal welding | Thermal welding | Thermal welding | Thermal welding |
| Bonding portion | — | Plane | Plane | Plane | Plane |
| Peeling load (23° C.) | N/cm$^2$ | 2000 | 2500 | 2500 | 2500 |
| Peeling load (200° C.) | N/cm$^2$ | 50 | 50 | 50 | 50 |
| Evaluation |  |  |  |  |  |
| Torsional rigidity | — | ⊙ | ⊙ | ⊙ | ⊙ |
| Deflection rigidity | — | ○ | ○ | ○ | ⊙ |

TABLE 11

|  |  | Example 33 | Example 34 | Example 35 | Reference Example 11 |
|---|---|---|---|---|---|
| Bottom cover: |  |  |  |  |  |
| Material | — | Material 11 | Material 11 | Material 11 | Material 11 |
| Length | mm | 210 | 210 | 210 | 180 |
| Width | mm | 300 | 300 | 300 | 230 |
| Height | mm | 10 | 10 | 10 | 7 |
| Thickness | mm | 0.8 | 0.8 | 0.8 | 0.8 |
| Projected area | cm$^2$ | 630 | 630 | 630 | 414 |
| Volume | cm$^3$ | 572 | 572 | 572 | 253 |
| Top cover: |  |  |  |  |  |
| Material | — | Material 11 | Material 11 | Material 11 | Display |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: |  |  |  |  |  |
| Material | — | Material 12 | Material 12 | Material 12 | Material 12 |
| Length | mm | 200 | 200 | 200 | 162 |
| Width | mm | 290 | 290 | 296 | 215 |
| Height | mm | 2 | 3 | 8 | 5 |
| Angle | ° | 90 | 90 | 90 | 90 |
| Thickness | mm | 0.8 | 0.8 | 0.8 | 0.5 |
| Overlap width | mm | 5 | 5 | 5 | 5 |

TABLE 11-continued

|  |  | Example 33 | Example 34 | Example 35 | Reference Example 11 |
|---|---|---|---|---|---|
| Bonding area | cm² | 48 | 48 | 49 | 37 |
| Projected area | cm³ | 580 | 580 | 610 | 348 |
| Volume | cm³ | 412 | 126 | 433 | 155 |
| Reinforcing structure: structure |  |  |  |  |  |
| Material | — | — | — | — | — |
| Length | mm | — | — | — | — |
| Width | mm | — | — | — | — |
| Height | mm | — | — | — | — |
| Electronic device housing |  |  |  |  |  |
| Projected area ratio | % | 92.1 | 92.1 | 96.8 | 84.1 |
| Volume ratio | % | 12.0 | 22.0 | 75.7 | 61.4 |
| Integration method | — | Thermal welding | Thermal welding | Thermal welding | Thermal welding |
| Bonding portion | — | Plane | Plane | Plane | Plane |
| Peeling load (23° C.) | N/cm² | 2500 | 2500 | 2500 | 2500 |
| Peeling load (200° C.) | N/cm² | 50 | 50 | 50 | 50 |
| Evaluation |  |  |  |  |  |
| Torsional rigidity | — | ○ | ○ | ⊙ | ⊙ |
| Deflection rigidity | — | ○ | ○ | ○ | ○ |

TABLE 12

|  |  | Comparative Example 11 | Comparative Example 12 | Comparative Example 13 |
|---|---|---|---|---|
| Bottom cover: |  |  |  |  |
| Material | — | Material 11 | Material 11/ Material 12 | Material 16 |
| Length | mm | 210 | 210 | 210 |
| Width | mm | 300 | 300 | 300 |
| Height | mm | 10 | 10 | 10 |
| Thickness | mm | 0.8 | 1.6 | 0.8 |
| Projected area | cm² | 630 | 630 | 630 |
| Volume | cm³ | 572 | 516 | 572 |
| Top cover: |  |  |  |  |
| Material | — | Material 11 | Material 11 | Material 16 |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | cm² | 630 | 630 | 630 |
| Volume | cm³ | — | — | — |
| Reinforcing structure: |  |  |  |  |
| Material | — | — | — | Material 16 |
| Length | mm | — | — | 200 |
| Width | mm | — | — | 290 |
| Height | mm | — | — | 8 |
| Angle | ° | — | — | 90 |
| Thickness | mm | — | — | 0.8 |
| Overlap width | mm | — | — | 5 |
| Bonding area | cm² | — | — | 48 |
| Projected area | cm² | — | — | 580 |
| Volume | cm³ | — | — | 412 |
| Reinforcing structure: structure |  |  |  |  |
| Material | — | — | — | — |
| Length | mm | — | — | — |
| Width | mm | — | — | — |
| Height | mm | — | — | — |
| Electronic device housing |  |  |  |  |
| Projected area ratio | % | 0.0 | 0.0 | 92.1 |
| Volume ratio | % | 0.0 | 0.0 | 72.0 |
| Integration method | — | — | — | Thermal welding |
| Bonding portion | — | — | — | Plane |
| Peeling load (23° C.) | N/cm² | — | — | 1500 |
| Peeling load (200° C.) | N/cm² | — | — | 50 |
| Evaluation |  |  |  |  |
| Torsional rigidity | — | X | X | ○ |
| Deflection rigidity | — | X | ○ | Δ |

Hereinafter, a fifth aspect of the present invention will be described in detail by way of examples. However, the present invention is not limited to the following examples.

<Evaluation and Measurement Methods>

(1) Torsional Rigidity Test

A housing 1 was fixed in a tester in such a manner that one side of the housing 1 was fixed by a U-shaped fixing tool 100, and the other side opposed to the fixed side was held by a support tool 101 as shown in FIG. 8(*a*), the displacement amount of the housing 1 was then measured when a load of 10 N was applied with a change rate set to 1°/min at an angle θ as shown in FIG. 8(*b*), and the measured value was defined as a torsional rigidity value of the housing.

(2) Deflection Rigidity Test

As shown in FIG. 9, the housing was installed in a tester in such a manner that it was able to apply a load F from the side of a bottom cover 2 or a top cover 4 to which a reinforcing structure was joined. "Instron" (registered trademark) Universal Tester Model 4201 (manufactured by Instron Co., Ltd.) was used as a tester. The deflection amount of the bottom cover 2 or the top cover 4 was measured when a load of 100 N was applied with the housing 1 pressed at the center position at a cross head speed of 1.0 mm/min using an indenter 102 having a diameter of 20 mm, and the measured value was defined as a deflection rigidity value.

(3) Evaluation of Flexural Modulus

In accordance with the specifications in ASTM D-790 (1997), the flexural moduli of materials to be used for the reinforcing structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. "Instron" (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.

(4) Peeling Load Test of Reinforcing Structure (23° C. and 200° C.)

The peeling load of the reinforcing structure was evaluated in accordance with "Testing methods for tensile strength of adhesive bonds" specified in JIS K6849 (1994). As test pieces in this test, housings obtained in examples and comparative examples were used. Here, for measuring the peeling strength of the reinforcing structure, evaluation was performed in a state in which there was not a top cover or bottom cover to which the reinforcing structure was not joined (before the reinforcing structure was joined). Specifically, as shown in FIG. 10, the bottom cover 2 or the top cover 4 of the housing 1 was fixed by a fixing tool 103, and the reinforcing structure 3 was fixed by a tensile tool 104. A tensile load F was applied while each member was fixed, and evaluation was performed until the reinforcing structure 3 was peeled off, or the tensile tool 104 was detached from the reinforcing structure 3. The bonding area here was calculated by measuring the width and length of the joining surface of the reinforcing structure 3 before joining. When joining was partially performed, the areas thereof were measured, and summed to determine a joining area. The peeling load of the reinforcing structure 3 was calculated from the resulting tensile load value and joining area. For the peeling load of the reinforcing structure 3 at 200° C., the housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the reinforcing structure 3, and evaluation was performed.

(5) Evaluation of Linear Expansion Coefficient of Each Member

The linear expansion coefficient of each member was evaluated by referring to "Testing method for linear thermal expansion coefficient of plastics by thermomechanical analysis" as specified in JIS K 7197 (1991). As test pieces in this evaluation, members obtained in examples and comparative examples were used. Here, the thickness was set to the thickness of each member, and processing was performed so that the length of one side was 5 mm, thereby preparing a test piece. The number of measurements was 5 (n=5), and the average value of the measurements was defined as a linear expansion coefficient of each member.

(6) Heat Cycle Test

The resulting housing was placed in a tester capable of controlling the inside atmospheric temperature, and programmed operation was performed. As programmed operation conditions, the minimum temperature was −25° C., the maximum temperature was 85° C., and after reaching each temperature, the temperature was maintained for 10 minutes, after which the temperature was changed at a rate of 1° C./min. A cycle of reaching the maximum temperature from the minimum temperature and reaching the minimum temperature from the maximum temperature was repeated ten times, followed by checking whether or not delamination or warpage occurred in the housing. A sample was rated o when there was no change from the state before the test, and a sample was rated x when delamination or warpage occurred.

<Materials Used>

Materials used for evaluation are shown below.

[Material 21]

"TORAYCA" Prepreg P3252S-12 (manufactured by Toray Industries, Inc.) was provided as material 21. The properties of material 21 are shown in Table 13 below.

[Material 22]

SCF183 EP-BL3 manufactured by SUPER RESIN. Inc. was provided as material 22. The properties of material 22 are shown in Table 13 below.

[Material 23]

An aluminum alloy A5052 was provided as material 23. The properties of material 23 are shown in Table 13 below.

[Material 24]

A magnesium alloy AZ31 was provided as material 24. The properties of material 24 are shown in Table 13 below.

[Material 25]

Using a master batch including 90% by mass of a polyamide 6 resin ("AMILAN" (registered trademark) CM1021T manufactured by Toray Industries, Inc.) and 10% by mass of a polyamide terpolymer resin composed of polyamide 6/66/610 ("AMILAN" (registered trademark) CM4000 manufactured by Toray Industries, Inc.), a thermoplastic resin film having a basis weight of 124 g/m$^2$ was prepared, and provided as material 25. The properties of material 25 are shown in Table 13 below.

[Material 26]

Resin pellets of a polycarbonate resin ("Iupilon" (registered trademark) H-4000" manufactured by Mitsubishi Engineering-Plastics Corporation) were provided. Before molding, the resin pellets were dried for 5 hours using a hot air circulating dryer with the inside temperature set to 120° C. The properties of material 26 are shown in Table 13 below.

TABLE 13

|  |  | Material 21 | Material 22 | Material 23 | Material 24 | Material 25 | Material 26 |
|---|---|---|---|---|---|---|---|
| Material | — | CFRP | GFRP | Al alloy | Mg alloy | Ny alloy | PC resin |
| Elastic modulus | GPa | 60 | 25 | 70 | 45 | 3.5 | 2.3 |
| Linear expansion coefficient | $10^{-6}/°$ C. | 0.3 | 7 | 23.6 | 26 | 83 | 65 |
| Thermal conductivity | W/m · K | 3.0 | 0.3 | 236.0 | 159.0 | 0.3 | 0.2 |

Example 41

Example 41-(1): Preparation of Bottom Cover

Seven sheets having a predetermined size were cut from material 21. Among them, four sheets were cut in such a manner that the fiber direction of a prepreg was parallel to a longitudinal direction (x direction in FIG. 1), and the other three sheets were cut in such a manner that the fiber direction was parallel to a lateral direction (y direction in FIG. 1). In this example, the lateral direction (y direction) was set to 0°, and as shown in FIG. 11, a laminate including seven prepreg sheets was prepared in such a manner that prepreg sheets 105*a* with the fiber direction set to 90° and prepreg sheets 105*b* with the fiber direction set to 0° were symmetrically laminated.

Here, a press molding apparatus and a pair of molds 106 as shown in FIG. 12(*a*) were used, and the resulting laminate 107 was disposed in a pair of molds 106. Here, the heating platen temperature of the press molding apparatus was set to 150° C., and as shown in FIG. 12(*b*), the molds 106 were moved, and the laminate was pressurized with the molding pressure kept at 1.0 MPa. After 30 minutes, the molds 106 were opened, and the molded article was removed from the molds 106. Trimming was performed so that the rising wall of the resulting molded article had a desired height, thereby obtaining a bottom cover.

Example 41-(2): Preparation of Top Cover

Except that molds configured to prepare a molded article having a smooth shape were used, the same procedure as in Example 41-(1) was carried out to obtain a molded article. Trimming was performed so that the resulting molded article had a desired size, thereby obtaining a top cover.

Example 41-(3): Preparation of Reinforcing Structure

Except that molds 106 as shown in FIG. 13 were used, the same procedure as in Example 41-(1) was carried out to obtain a molded article. Trimming was performed so that the joining surface of the resulting molded article had a desired width, thereby obtaining a reinforcing structure.

Example 41-(4): Preparation of Housing

The members obtained in Examples 41-(1) to 41-(3) were joined using an adhesive 108 as shown in FIG. 14. The molding conditions and evaluation results in Example 41 are shown in Table 14 below.

Example 42

Except that a material as described in Table 14 was used, the same procedure as in Examples 41-(1) to 41-(4) was carried out to obtain a housing. The molding conditions and evaluation results in Example 42 are shown in Table 14 below.

Example 43

Except that a material as described in Table 14 was used, the heating platen temperature was 220° C., and the molding pressure was 10 MPa, the same procedure as in Examples 41-(1) to 41-(4) was carried out to obtain a housing. The molding conditions and evaluation results in Example 43 are shown in Table 14 below.

Example 44

Using an injection molding machine, a material as described in Table 14 was subjected to injection molding with the cylinder temperature and the mold temperature set to 260° C. and 80° C., respectively, thereby obtaining each member. Using the resulting members, the same procedure as in Example 41-(4) was carried out to obtain a housing. The molding conditions and evaluation results in Example 44 are shown in Table 14 below.

Example 45

A bottom cover and a top cover were prepared in the same manner as in Example 43, and a reinforcing structure was prepared in the same manner as in Example 44. Using the resulting members, the same procedure as in Example 41-(4) was carried out to obtain a housing. The molding conditions and evaluation results in Example 45 are shown in Table 15 below.

Example 46

A bottom cover and a top cover were prepared in the same manner as in Example 43, and a reinforcing structure was prepared in the same manner as in Example 42. Using the resulting members, the same procedure as in Example 41-(4) was carried out to obtain a housing. The molding conditions and evaluation results in Example 46 are shown in Table 15 below.

Example 47

A bottom cover and a reinforcing structure that were obtained in the same manner as in Examples 41-(1) and 41-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 41-(1) to 41-(4) was carried out to obtain a housing. The molding conditions and evaluation results in Example 47 are shown in Table 15 below.

Example 48

A bottom cover and a reinforcing structure that were obtained in the same manner as in Examples 42-(1) and 42-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 42-(1) to 42-(4) was carried out to obtain a housing. The molding conditions and evaluation results in Example 48 are shown in Table 15 below.

Example 49

A bottom cover and a reinforcing structure that were obtained in the same manner as in Examples 43-(1) and 43-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 43-(1) to 43-(4) was carried out to obtain a housing. The molding conditions and evaluation results in Example 49 are shown in Table 16 below.

Example 50

A bottom cover and a reinforcing structure that were obtained in the same manner as in Examples 44-(1) and 44-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 44-(1) to 44-(4) was carried out to obtain a housing. The molding conditions and evaluation results in Example 50 are shown in Table 16 below.

Example 51

A bottom cover and a reinforcing structure that were obtained in the same manner as in Examples 45-(1) and 45-(3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 45-(1) to 45-(4) was carried out to obtain a housing. The molding conditions and evaluation results in Example 51 are shown in Table 16 below.

Example 52

A bottom cover and a top cover were prepared in the same manner as in Example 44. Using an injection molding machine, a material as described in Table 16 was subjected to injection molding with the cylinder temperature and the mold temperature set to 280° C. and 100° C., respectively, thereby obtaining a reinforcing structure. The resulting bottom cover and reinforcing structure were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 50-(1) to 50-(4) was carried out to obtain a housing. The molding conditions and evaluation results in Example 52 are shown in Table 16 below.

Example 53

Each member was obtained in the same manner as in Example 46. The resulting bottom cover and reinforcing structure were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 46-(1) to 46-(4) was carried out to obtain a housing. The molding conditions and evaluation results in Example 53 are shown in Table 17 below.

Example 54

Using an injection molding machine, material 25 was subjected to injection molding with the cylinder temperature and the mold temperature set to 260° C. and 80° C., respectively, thereby obtaining a 3 mm-thick plate-like molded article as another reinforcing structure. The resulting molded article was processed so as to have a height of 7.2 mm, thereby obtaining another reinforcing structure having a size as shown in Table 17. The resulting another reinforcing structure was disposed as shown in FIG. 7, and joined by an adhesive, and subsequently the same procedure as in Examples 50-(1) to 50-(4) to obtain a housing. The molding conditions and evaluation results in Example 54 are shown in Table 17 below.

Example 55

A bottom cover and a reinforcing structure that were obtained in the same manner as in Examples 50-(1) and 50-(2) were joined to each other by an ultrasonic welding method. Except for the method for joining, the same procedure as in Examples 50-(1) to 50-(4) was carried out to obtain a housing. The molding conditions and evaluation results in Example 55 are shown in Table 17 below.

Example 56

Example 56-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the reinforcing structure, thereby obtaining a laminate. Except that the resulting laminate was used, the same procedure as in Example 41-(1) was carried out to obtain a bottom cover.

Example 56-(2): Preparation of Top Cover

As in the case of Example 56-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 41-(2) was carried out to obtain a top cover.

Example 56-(3): Preparation of Reinforcing Structure

As in the case of Example 56-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 41-(3) was carried out to obtain a reinforcing structure.

Example 56-(4): Preparation of Housing

The reinforcing structure obtained in Example 56-(3) was superposed in a joined form on the bottom cover obtained in Example 56-(1) were superposed on each other in joined form, a joining tool 109 as shown in FIG. 15 was provided, and the joined bottom cover and reinforcing structure were disposed, and heated and pressurized in a press molding apparatus set so that the joining tool 109 had a surface temperature of 180° C. After 1 minute, the bottom cover 2, the reinforcing structure 3 and the joining tool 109 were taken out from the press molding apparatus, and cooled. After 5 minutes, the joining tool 109 was removed to obtain an integrated product of the bottom cover 2 and the reinforcing structure 3. Thereafter, the top cover 4 was joined using an adhesive in the same manner as in Example 41-(4). The molding conditions and evaluation results in Example 56 are shown in Table 17 below.

Example 57

Except that a material as described in Table 18 was used, the same procedure as in Examples 56-(1) to 56-(4) was carried out to obtain a housing. The molding conditions and evaluation results in Example 57 are shown in Table 18 below.

Example 58

Except that a reinforcing structure obtained in the same manner as in Example 43 was used, the same procedure as in Example 57 was carried out to obtain a housing. The molding conditions and evaluation results in Example 58 are shown in Table 18 below.

Example 59

Except that the heating platen temperature was 200° C., the same procedure as in Example 43 was carried out to obtain a bottom cover and a top cover. In addition, a reinforcing structure was obtained in the same manner as in Example 57. Except that the resulting members were used, the same procedure as in Example 56 was carried out to obtain a housing. The molding conditions and evaluation results in Example 59 are shown in Table 18 below.

Example 60

A bottom cover and a top cover were obtained in the same manner as in Example 43. In addition, a reinforcing structure was obtained in the same manner as in Example 57. Except that the resulting members were used, the same procedure as in Example 56 was carried out to obtain a housing. The molding conditions and evaluation results in Example 60 are shown in Table 18 below.

Examples 61 to 63

Except that a size as described in Table 19 was employed, the same procedure as in Example 60 was carried out to obtain each member. Using the resulting members, the same procedure as in Example 56 was carried out to obtain a housing. The molding conditions and evaluation results in Examples 61 and 63 are shown in Table 19 below.

Reference Example 21

Except that a size as described in Table 19 was employed, the same procedure as in Example 60 was carried out to obtain a bottom cover and a reinforcing structure. Electronic components were disposed in a hollow structure S1 formed by the bottom cover and the reinforcing structure, and a joining portion was joined by an ultrasonic welding machine in the same manner as in Example 60. In addition, as a top cover, a liquid crystal display was provided, and joined to a bottom cover by a double-sided tape. The molding conditions and evaluation results in Reference Example 21 are shown in Table 19 below.

Comparative Example 21

A bottom cover and a top cover were obtained in the same manner as in Example 41. In addition, a reinforcing structure was obtained in the same manner as in Example 44. Except that the resulting members were used, the same procedure as in Examples 41-(1) to 41-(4) was carried out to obtain a housing. The molding conditions and evaluation results in Comparative Example 21 are shown in Table 20 below.
[Evaluation]

It was confirmed that in the housings obtained in examples, either delamination or warpage did not occur between the reinforcing structure and the bottom cover even after the heat cycle test, and thus these housings were excellent in dimensional stability. In addition, it was confirmed that these housings also had high torsional rigidity. In particular, Examples 47 to 63 are preferable from the viewpoint of repair and recycling because the top cover and the reinforcing structure are joined to each other by thermal welding, and therefore the reinforcing structure can be disassembled by heating while high torsional rigidity and deflection rigidity are exhibited. Examples 56 to 63 are preferable from the viewpoint of weight reduction because the reinforcing structure and the bottom cover are bonded directly to each other, and therefore an increase in weight is smaller as compared to a case where an adhesive or a hot melt resin is used. It was confirmed that in Example 54, not only torsional rigidity but also deflection rigidity was exhibited due to the effect of another reinforcing structure.

In examples where a glass fiber-reinforced composite material, a carbon fiber-reinforced composite material or a metal material having high dynamic properties was used for the bottom cover, not only high torsional rigidity but also deflection rigidity was exhibited. In addition, the metal material has a high thermal conductivity, and is therefore preferable from the viewpoint of thermal characteristics. In examples where a resin or a glass fiber-reinforced composite material was used for the bottom cover are preferable from the viewpoint of not only exhibiting high torsional rigidity but also enabling radio wave communication because the bottom cover has electromagnetic wave permeability. It was confirmed that in examples where only a resin material was used, the housing had poor deflection rigidity, but exhibited torsional rigidity. In addition, Reference Example 21 was provided as a method for using a housing, where electronic components were disposed in a hollow structure to prepare an electronic device with a liquid crystal display used as atop cover. It was confirmed that when the requirements of the present invention were satisfied, it was possible to provide an electronic device exhibiting high torsional rigidity and deflection rigidity.

On the other hand, Comparative Example 21 exhibited torsional rigidity and deflection rigidity, but after the heat cycle test, the reinforcing structure and the bottom cover were peeled off from each other. Such a housing can be used only in a limited environment, and does not meet requests from the market.

TABLE 14

|  |  | Example 41 | Example 42 | Example 43 | Example 44 |
|---|---|---|---|---|---|
| Bottom cover: | | | | | |
| Material | — | Material 21 | Material 22 | Material 23 | Material 25 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.6 | 0.8 |
| Projected area | $cm^2$ | 630 | 630 | 630 | 630 |
| Volume | $cm^3$ | 572 | 572 | 586 | 572 |
| Top cover: | | | | | |
| Material | — | Material 21 | Material 22 | Material 23 | Material 25 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: | | | | | |
| Material | — | Material 21 | Material 22 | Material 23 | Material 25 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 412 | 412 |
| Reinforcing structure: structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 92.1 | 92.1 | 92.1 | 92.1 |
| Volume ratio | % | 72.0 | 72.0 | 70.2 | 72.0 |
| Integration method | — | Adhesive | Adhesive | Adhesive | Adhesive |
| Bonding portion | — | Plane | Plane | Plane | Plane |
| Peeling load (23° C.) | $N/cm^2$ | 1500 | 1500 | 1500 | 1500 |
| Peeling load (200° C.) | $N/cm^2$ | 700 | 700 | 700 | 700 |
| Linear expansion coefficient ratio | — | 1.0 | 1.0 | 1.0 | 1.0 |
| Evaluation | | | | | |
| Torsional rigidity | — | ⊙ | ⊙ | ⊙ | ○ |
| Deflection rigidity | — | ○ | ○ | ○ | Δ |
| Heat cycle test | — | ○ | ○ | ○ | ○ |

TABLE 15

|  |  | Example 45 | Example 46 | Example 47 | Example 48 |
|---|---|---|---|---|---|
| Bottom cover: | | | | | |
| Material | — | Material 23 | Material 23 | Material 21 | Material 22 |
| Length | mm | 210 | 210 | 210 | 210 |
| Width | mm | 300 | 300 | 300 | 300 |
| Height | mm | 10 | 10 | 10 | 10 |
| Thickness | mm | 0.6 | 0.6 | 0.8 | 0.8 |
| Projected area | cm$^2$ | 630 | 630 | 630 | 630 |
| Volume | cm$^3$ | 586 | 586 | 572 | 572 |
| Top cover: | | | | | |
| Material | — | Material 23 | Material 23 | Material 21 | Material 22 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: | | | | | |
| Material | — | Material 25 | Material 22 | Material 21 | Material 22 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 412 | 412 | 412 |
| Reinforcing structure: structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 92.1 | 92.1 | 92.1 | 92.1 |
| Volume ratio | % | 70.2 | 70.2 | 72.0 | 72.0 |
| Integration method | — | Adhesive | Adhesive | Thermal welding | Thermal welding |
| Bonding portion | — | Plane | Plane | Plane | Plane |
| Peeling load (23° C.) | N/cm$^2$ | 1500 | 1500 | 2000 | 2000 |
| Peeling load (200° C.) | N/cm$^2$ | 700 | 700 | 100 | 100 |
| Linear expansion coefficient ratio | — | 0.3 | 3.4 | 1.0 | 1.0 |
| Evaluation | | | | | |
| Torsional rigidity | — | ⊙ | ⊙ | ⊙ | ⊙ |
| Deflection rigidity | — | ○ | ○ | ○ | ○ |
| Heat cycle test | — | ○ | ○ | ○ | ○ |

TABLE 16

|  |  | Example 49 | Example 50 | Example 51 | Example 52 |
|---|---|---|---|---|---|
| Bottom cover: | | | | | |
| Material | — | Material 23 | Material 25 | Material 23 | Material 25 |
| Length | mm | 210 | 210 | 210 | 210 |
| Width | mm | 300 | 300 | 300 | 300 |
| Height | mm | 10 | 10 | 10 | 10 |
| Thickness | mm | 0.6 | 0.8 | 0.6 | 0.8 |
| Projected area | cm$^2$ | 630 | 630 | 630 | 630 |
| Volume | cm$^3$ | 586 | 572 | 586 | 572 |

TABLE 16-continued

|  |  | Example 49 | Example 50 | Example 51 | Example 52 |
|---|---|---|---|---|---|
| Top cover: |  |  |  |  |  |
| Material | — | Material 23 | Material 25 | Material 23 | Material 25 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: |  |  |  |  |  |
| Material | — | Material 23 | Material 25 | Material 25 | Material 26 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 412 | 412 | 412 |
| Another reinforcing structure |  |  |  |  |  |
| Material | — | — | — | — | — |
| Length | mm | — | — | — | — |
| Width | mm | — | — | — | — |
| Height | mm | — | — | — | — |
| Electronic device housing |  |  |  |  |  |
| Projected area ratio | % | 92.1 | 92.1 | 92.1 | 92.1 |
| Volume ratio | % | 70.2 | 72.0 | 70.2 | 72.0 |
| Integration method | — | Thermal welding | Thermal welding | Thermal welding | Thermal welding |
| Bonding portion | — | Plane | Plane | Plane | Plane |
| Peeling load (23° C.) | N/cm$^2$ | 2000 | 2000 | 2000 | 2000 |
| Peeling load (200° C.) | N/cm$^2$ | 50 | 50 | 50 | 50 |
| Linear expansion coefficient ratio | — | 1.0 | 1.0 | 0.3 | 1.7 |
| Evaluation |  |  |  |  |  |
| Torsional rigidity | — | ⊙ | ○ | ⊙ | ○ |
| Deflection rigidity | — | ○ | Δ | ○ | Δ |
| Heat cycle test | — | ○ | ○ | ○ | ○ |

TABLE 17

|  |  | Example 53 | Example 54 | Example 55 | Example 56 |
|---|---|---|---|---|---|
| Bottom cover: |  |  |  |  |  |
| Material | — | Material 23 | Material 25 | Material 25 | Material 21 |
| Length | mm | 210 | 210 | 210 | 210 |
| Width | mm | 300 | 300 | 300 | 300 |
| Height | mm | 10 | 10 | 10 | 10 |
| Thickness | mm | 0.6 | 0.8 | 0.8 | 0.8 |
| Projected area | cm$^2$ | 630 | 630 | 630 | 630 |
| Volume | cm$^3$ | 586 | 572 | 572 | 572 |
| Top cover: |  |  |  |  |  |
| Material | — | Material 23 | Material 25 | Material 25 | Material 21 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |

TABLE 17-continued

|  |  | Example 53 | Example 54 | Example 55 | Example 56 |
|---|---|---|---|---|---|
| Reinforcing structure: | | | | | |
| Material | — | Material 22 | Material 25 | Material 25 | Material 21 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | cm² | 48 | 48 | 48 | 48 |
| Projected area | cm² | 580 | 580 | 580 | 580 |
| Volume | cm³ | 412 | 412 | 412 | 412 |
| Another reinforcing structure | | | | | |
| Material | — | — | Material 25 | — | — |
| Length | mm | — | 188 | — | — |
| Width | mm | — | 3 | — | — |
| Height | mm | — | 4 | — | — |
| Electronic device housing | | | | | |
| Projected area ratio | % | 92.1 | 92.1 | 92.1 | 92.1 |
| Volume ratio | % | 70.2 | 72.0 | 72.0 | 72.0 |
| Integration method | — | Thermal welding | Thermal welding | Thermal welding | Thermal welding |
| Bonding portion | — | Plane | Plane | Plane | Plane |
| Peeling load (23° C.) | N/cm² | 2000 | 2000 | 1500 | 2000 |
| Peeling load (200° C.) | N/cm² | 50 | 50 | 50 | 50 |
| Linear expansion coefficient ratio | — | 3.4 | 1.0 | 0.3 | 1.7 |
| Evaluation | | | | | |
| Torsional rigidity | — | ⊙ | ○ | ○ | ⊙ |
| Deflection rigidity | — | ○ | Δ | ○ | ○ |
| Heat cycle test | — | ○ | ○ | ○ | ○ |

TABLE 18

|  |  | Example 57 | Example 58 | Example 59 | Example 60 |
|---|---|---|---|---|---|
| Bottom cover: | | | | | |
| Material | — | Material 22 | Material 22 | Material 24 | Material 23 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | cm² | 630 | 630 | 630 | 630 |
| Volume | cm³ | 572 | 572 | 572 | 586 |
| Top cover: | | | | | |
| Material | — | Material 22 | Material 22 | Material 24 | Material 23 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm² | 630 | 630 | 630 | 630 |
| Volume | cm³ | — | — | — | — |
| Reinforcing structure: | | | | | |
| Material | — | Material 22 | Material 23 | Material 22 | Material 22 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.6 | 0.8 | 0.8 |
| Overlap width | mm | 5 | 5 | 5 | 5 |
| Bonding area | cm² | 48 | 48 | 48 | 48 |

TABLE 18-continued

|  |  | Example 57 | Example 58 | Example 59 | Example 60 |
|---|---|---|---|---|---|
| Projected area | cm² | 580 | 580 | 580 | 580 |
| Volume | cm³ | 412 | 425 | 412 | 412 |
| Another reinforcing structure |  |  |  |  |  |
| Material | — | — | — | — | — |
| Length | mm | — | — | — | — |
| Width | mm | — | — | — | — |
| Height | mm | — | — | — | — |
| Electronic device housing |  |  |  |  |  |
| Projected area ratio | % | 92.1 | 92.1 | 92.1 | 92.1 |
| Volume ratio | % | 72.0 | 74.3 | 72.0 | 70.2 |
| Integration method | — | Thermal welding | Thermal welding | Thermal welding | Thermal welding |
| Bonding portion | — | Plane | Plane | Plane | Plane |
| Peeling load (23° C.) | N/cm² | 2500 | 2500 | 2500 | 2500 |
| Peeling load (200° C.) | N/cm² | 50 | 50 | 50 | 50 |
| Linear expansion coefficient ratio | — | 1.0 | 0.3 | 3.7 | 3.4 |
| Evaluation |  |  |  |  |  |
| Torsional rigidity | — | ⊙ | ⊙ | ○ | ⊙ |
| Deflection rigidity | — | ○ | ○ | ○ | ○ |
| Heat cycle test | — | ○ | ○ | ○ | ○ |

TABLE 19

|  |  | Example 61 | Example 62 | Example 63 | Reference Example 21 |
|---|---|---|---|---|---|
| Bottom cover: |  |  |  |  |  |
| Material | — | Material 23 | Material 23 | Material 23 | Material 23 |
| Length | mm | 210 | 210 | 210 | 210 |
| Width | mm | 300 | 300 | 300 | 230 |
| Height | mm | 10 | 10 | 10 | 7 |
| Thickness | mm | 0.8 | 0.8 | 0.8 | 0.8 |
| Projected area | cm² | 630 | 630 | 630 | 414 |
| Volume | cm³ | 572 | 572 | 572 | 253 |
| Top cover: |  |  |  |  |  |
| Material | — | Material 23 | Material 23 | Material 23 | Display |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm² | 630 | 630 | 630 | 630 |
| Volume | cm³ | — | — | — | — |
| Reinforcing structure: |  |  |  |  |  |
| Material | — | Material 22 | Material 22 | Material 22 | Material 22 |
| Length | mm | 206 | 200 | 206 | 162 |
| Width | mm | 296 | 290 | 296 | 215 |
| Height | mm | 3 | 3 | 8 | 5 |
| Angle | ° | 90 | 90 | 90 | 90 |
| Thickness | mm | 0.8 | 0.6 | 0.8 | 0.8 |
| Overlap width | mm | 5 | 5 | 5 | 5 |
| Bonding area | cm² | 49 | 48 | 49 | 37 |
| Projected area | cm² | 610 | 580 | 610 | 348.3 |
| Volume | cm³ | 132 | 126 | 433 | 155 |
| Another reinforcing structure |  |  |  |  |  |
| Material | — | — | — | — | — |
| Length | mm | — | — | — | — |
| Width | mm | — | — | — | — |
| Height | mm | — | — | — | — |

TABLE 19-continued

|  |  | Example 61 | Example 62 | Example 63 | Reference Example 21 |
|---|---|---|---|---|---|
| Electronic device housing |  |  |  |  |  |
| Projected area ratio | % | 96.8 | 92.1 | 96.8 | 84.1 |
| Volume ratio | % | 23.1 | 22.0 | 75.7 | 61.4 |
| Integration method | — | Thermal welding | Thermal welding | Thermal welding | Thermal welding |
| Bonding portion | — | Plane | Plane | Plane | Plane |
| Peeling load (23° C.) | N/cm$^2$ | 2500 | 2500 | 2500 | 2500 |
| Peeling load (200° C.) | N/cm$^2$ | 50 | 50 | 50 | 50 |
| Linear expansion coefficient ratio | — | 3.4 | 3.4 | 3.4 | 3.4 |
| Evaluation |  |  |  |  |  |
| Torsional rigidity | — | ◯ | ◯ | ⊙ | ⊙ |
| Deflection rigidity | — | ◯ | ◯ | ◯ | ◯ |
| Heat cycle test | — | ◯ | ◯ | ◯ | ◯ |

TABLE 20

|  |  | Comparative Example 21 |
|---|---|---|
| Bottom cover: |  |  |
| Material | — | Material 21 |
| Length | mm | 210 |
| Width | mm | 300 |
| Height | mm | 10 |
| Thickness | mm | 0.8 |
| Projected area | cm$^2$ | 630 |
| Volume | cm$^3$ | 572 |
| Top cover: |  |  |
| Material | — | Material 21 |
| Length | mm | 210 |
| Width | mm | 300 |
| Height | mm | — |
| Thickness | mm | 0.8 |
| Projected area | cm$^2$ | 630 |
| Volume | cm$^3$ | — |
| Reinforcing structure: |  |  |
| Material | — | Material 25 |
| Length | mm | 200 |
| Width | mm | 290 |
| Height | mm | 8 |
| Angle | ° | 90 |
| Thickness | mm | 0.8 |
| Overlap width | mm | 5 |
| Bonding area | cm$^2$ | 48 |
| Projected area | cm$^2$ | 580 |
| Volume | cm$^3$ | 412 |
| Another reinforcing structure |  |  |
| Material | — | — |
| Length | mm | — |
| Width | mm | — |
| Height | mm | — |
| Electronic device housing |  |  |
| Projected area ratio | % | 92.1 |
| Volume ratio | % | 72.0 |
| Integration method | — | Adhesive |
| Bonding portion | — | Plane |
| Peeling load (23° C.) | N/cm$^2$ | 1500 |
| Peeling load (200° C.) | N/cm$^2$ | 700 |
| Linear expansion coefficient ratio | — | 0.004 |
| Evaluation |  |  |
| Torsional rigidity | — | Δ |
| Deflection rigidity | — | ◯ |
| Heat cycle test | — | X |

INDUSTRIAL APPLICABILITY

According to the present invention, there can be provided a housing having improved torsional rigidity and deflection rigidity while attaining thickness reduction and weight reduction. In addition, according to the present invention, there can be provided a housing having improved torsional rigidity while attaining thickness reduction, weight reduction and improvement of portability. In addition, according to the present invention, there can be provided a housing having high torsional rigidity and improved dimensional stability.

DESCRIPTION OF REFERENCE SIGNS

1: Housing
2: Bottom cover
3: Reinforcing structure
4: Top cover
5: Another reinforcing structure
21: Flat portion
22: Rising wall member
31: Flat portion
32: Rising wall member
33: Joining portion

The invention claimed is:

1. A housing comprising: a top cover; a bottom cover having a flat portion and a rising wall member erected from a rim of the flat portion toward the top cover and joined to the top cover; and a reinforcing structure which is disposed in a space divided by the top cover and the bottom cover,
wherein the bottom cover is formed of a material having a thickness of 0.1 mm or more and 0.8 mm or less and an elastic modulus of 20 GPa or more and 120 GPa or less,
wherein the reinforcing structure includes:
a flat portion or a curved portion; and
a rising wall member erected on a rim of the flat portion or on a rim of the curved portion, and
wherein the reinforcing structure is joined to the bottom cover with a hollow structure formed between the flat portion or the curved portion of the reinforcing structure and the flat portion of the bottom cover.

2. The housing according to claim 1,
wherein the reinforcing structure is formed of a material having a thickness of 0.3 mm or more and 0.8 mm or less, and an elastic modulus of 20 GPa or more and 120 GPa or less.

3. The housing according to claim 1,
wherein the reinforcing structure, and the top cover or the bottom cover to which the reinforcing structure is joined are formed of a fiber-reinforced composite material that is a cured product of a laminate of prepregs including a reinforcing fiber and a matrix resin.

4. The housing according to claim 1,
wherein the reinforcing structure is joined to the bottom cover by thermal welding.

5. The housing according to claim 1,
wherein the reinforcing structure is joined to the bottom cover in such a manner that the peeling load at 23° C. is within a range of 60 N/cm$^2$ or more and 5000 N/cm$^2$ or less, and the peeling load at 200° C. is within a range of less than 60 N/cm$^2$.

6. The housing according to claim 1,
wherein the reinforcing structure is joined directly to the bottom cover.

7. The housing according to claim 1,
wherein the projected area of the reinforcing structure in a direction of the bottom cover which is joined to the reinforcing structure is within a range of 60% or more and 95% or less of the area of the bottom cover to which the reinforcing structure is joined.

8. The housing according to claim 1,
wherein the volume of a hollow structure formed by joining the reinforcing structure to the bottom cover is within a range of 55% or more and 95% or less of the volume of the space.

9. The housing according to claim 1,
wherein a heat generation member is disposed on a surface of the reinforcing structure on the hollow structure side.

10. The housing according to claim 1,
wherein another reinforcing structure connecting the inner surface of the reinforcing structure and the bottom cover to which the reinforcing structure is joined is provided in a hollow structure formed between the reinforcing structure and the bottom cover to which the reinforcing structure is joined.

11. A housing comprising: a top cover; a bottom cover having a flat portion and a rising wall member erected from a rim of the flat portion toward the top cover and joined to the top cover at a rim; and a reinforcing structure which is disposed in a space divided by the top cover and the bottom cover,
wherein the bottom cover is formed of a fiber-reinforced composite material that is a cured product of a laminate of prepregs including a reinforcing fiber and a matrix resin,
wherein the reinforcing structure includes:
a flat portion or a curved portion; and
a rising wall member erected on a rim of the flat portion or on a rim of the curved portion, and
wherein the reinforcing structure is joined to the bottom cover with a hollow structure formed between the flat portion or the curved portion of the reinforcing structure and the flat portion of the bottom cover.

12. A housing comprising: a top cover; a bottom cover having a flat portion and a rising wall member erected from a rim of the flat portion toward the top cover and joined to the top cover at a rim; and a reinforcing structure which is disposed in a space divided by the top cover and the bottom cover,
wherein the reinforcing structure is formed of a material having a thickness of 0.3 mm or more and 0.8 mm or less and an elastic modulus of 20 GPa or more and 120 GPa or less,
wherein the reinforcing structure includes:
a flat portion or a curved portion; and
a rising wall member erected on a rim of the flat portion or on a rim of the curved portion, and
wherein the reinforcing structure is joined to the bottom cover with a hollow structure formed between the flat portion or the curved portion of the reinforcing structure and the flat portion of the bottom cover.

13. The housing according to claim 12,
wherein the bottom cover is formed of a material having a thickness of 0.1 mm or more and 0.8 mm or less, and an elastic modulus of 20 GPa or more and 120 GPa or less.

14. A housing comprising: a top cover; a bottom cover having a flat portion and a rising wall member erected from a rim of the flat portion toward the top cover and joined to the top cover at a rim; and a reinforcing structure which is disposed in a space divided by the top cover and the bottom cover,
wherein the reinforcing structure is formed of a fiber-reinforced composite material that is a cured product of a laminate of prepregs including a reinforcing fiber and a matrix resin,
wherein the reinforcing structure includes:
a flat portion or a curved portion; and
a rising wall member erected on a rim of the flat portion or on a rim of the curved portion, and
wherein the reinforcing structure is joined to the bottom cover with a hollow structure formed between the flat portion or the curved portion of the reinforcing structure and the flat portion of the bottom cover.

15. A housing comprising: a top cover; a bottom cover having a flat portion and a rising wall member erected from a rim of the flat portion toward the top cover and joined to the top cover at a rim; and a reinforcing structure which is disposed in a space divided by the top cover and the bottom cover,
wherein the reinforcing structure includes:
a flat portion or a curved portion; and
a rising wall member erected on a rim of the flat portion or on a rim of the curved portion, wherein the reinforcing structure is joined to the bottom cover or the top cover with a hollow structure formed between the reinforcing structure and the bottom cover or the top cover, and wherein a ratio of the linear expansion coefficient of the reinforcing structure to the linear expansion coefficient of the bottom cover or the top cover which is joined to the reinforcing structure is within a range of 0.1 or more and 10 or less.

16. A housing comprising: a top cover; a bottom cover having a flat portion and a rising wall member erected from a rim of the flat portion toward the top cover and joined to the top cover at a rim; and a reinforcing structure which is disposed in a space divided by the top cover and the bottom cover, wherein the reinforcing structure includes:
a flat portion or a curved portion; and
a rising wall member erected on a rim of the flat portion or on a rim of the curved portion, wherein the reinforcing structure is joined to the bottom cover with a hollow structure formed between the flat portion or the curved portion of the reinforcing structure and the flat portion of the bottom cover, and wherein the volume of the hollow structure formed by joining the reinforcing structure to the bottom cover is within a range of 55% or more and 95% or less of the volume of the space.

17. The housing according to claim 16,
wherein the projected area of the reinforcing structure in a direction of the bottom cover which is joined to the reinforcing structure is within a range of 60% or more and 95% or less of the area of the bottom cover to which the reinforcing structure is joined.

18. The housing according to claim 17,
wherein a shape of a projected surface of the reinforcing structure is a rectangular shape.

* * * * *